US012247903B2

(12) United States Patent
Vo

(10) Patent No.: US 12,247,903 B2
(45) Date of Patent: Mar. 11, 2025

(54) LABORATORY (LAB) GRINDERS CAPABLE OF SIMULTANEOUSLY GRINDING AND HANDLE-RELEASING OF ISOLATED MULTIPLE SAMPLES WITHOUT CROSS-CONTAMINATION AND METHODS OF MANUFACTURING AND USING THE SAME

(71) Applicant: Toi Van Vo, Arlington, MA (US)

(72) Inventor: Toi Van Vo, Arlington, MA (US)

(73) Assignee: Vietnam National University Ho Chi Minh City, Ho Chi Minh (VN)

( * ) Notice: Subject to any disclaimer, the term of this patent is extended or adjusted under 35 U.S.C. 154(b) by 0 days.

(21) Appl. No.: 18/467,723

(22) Filed: Sep. 14, 2023

(65) Prior Publication Data

US 2024/0133777 A1    Apr. 25, 2024

Related U.S. Application Data

(63) Continuation-in-part of application No. 17/398,744, filed on Aug. 10, 2021.

(51) Int. Cl.
*G01N 1/28* (2006.01)
(52) U.S. Cl.
CPC ..... *G01N 1/286* (2013.01); *G01N 2001/2866* (2013.01)
(58) Field of Classification Search
CPC ............ G01N 1/286; G01N 2001/2866; B02C 19/08; B02C 25/00; A47J 42/46; A47J 42/06; A47J 42/16; A47J 42/26; A47J 42/36; B25G 3/16; B23B 31/268; B23B 31/113; B23B 2240/04; Y10T 279/17863; Y10T 279/17888; Y10T 279/17881
USPC ..................... 241/199, 199.1, 199.9, 199.12
See application file for complete search history.

(56) References Cited

U.S. PATENT DOCUMENTS

| | | | |
|---|---|---|---|
| 6,981,427 B2 * | 1/2006 | Roggero | B02C 19/08 |
| | | | 73/866 |
| 9,556,410 B2 * | 1/2017 | Jindo | C12M 47/08 |
| 2004/0005608 A1 * | 1/2004 | Saghbini | G01N 1/286 |
| | | | 435/6.12 |

FOREIGN PATENT DOCUMENTS

| | | | | |
|---|---|---|---|---|
| CN | 109387412 A | * | 2/2019 | ............. B02C 19/08 |
| FR | 2990883 A1 | * | 11/2013 | ............. B02C 19/08 |

OTHER PUBLICATIONS

Machine translation of CN-109387412-A (Year: 2019).*

* cited by examiner

*Primary Examiner* — Jimmy T Nguyen
*Assistant Examiner* — Teresa A Guthrie

(57) ABSTRACT

A cross-contamination free and multiple laboratory sample grinder includes: a controller unit having a motor and a controller unit; a tube receptacle unit, removably laid on top of the controller unit, comprises a plurality of compartments designed to contain a plurality of laboratory tubes; and a top housing unit, removably laid on top of the tube receptacle unit, comprises an array of pestles coupled to a gear system that is operated by that motor. The top housing unit comprises a handle and a roller connector having a pair of wheels when rotated operable to eject the array of pestles into the plurality of laboratory tubes.

20 Claims, 32 Drawing Sheets

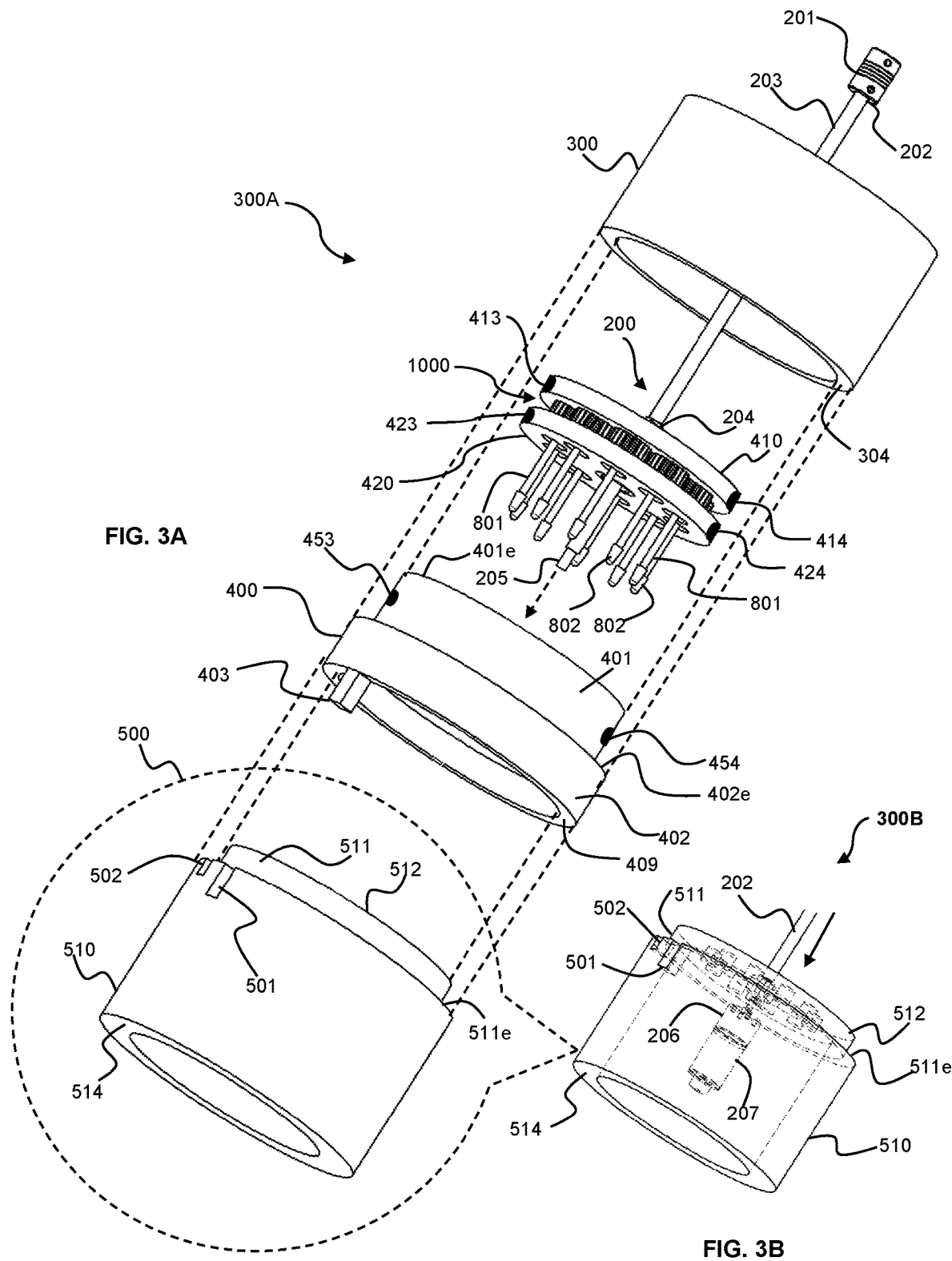

LABORATORY (LAB) GRINDERS CAPABLE OF SIMULTANEOUSLY GRINDING AND HANDLE-RELEASING OF ISOLATED MULTIPLE SAMPLES WITHOUT CROSS-CONTAMINATION AND METHODS OF MANUFACTURING AND USING THE SAME

CLAIM OF PRIORITY

This application is a continuation-in-part (CIP) application under 35 U.S.C. § 120 of application Ser. No. 17/398,744, filed on Aug. 10, 2021, entitled, "Laboratory (Lab) Grinders Capable of Simultaneously Grinding Multiple Samples Without Cross-Contamination and Method of Grinding Lab Samples" by Toi Van Vo. The patent application identified above is incorporated here by reference in its entirety.

FIELD OF THE INVENTION

The present invention relates generally to the field of laboratory testing devices. More specifically, the present invention relates to a laboratory grinding machine.

BACKGROUND ART

Clinical and diagnostic tests in laboratories are useful in screening, diagnosis, prognosis, therapeutic monitoring, follow-up tests, and other qualitative and quantitative applications. These tests require grinding or homogenizing specimens-including tissue, cells, and other samples. Conventionally, mechanical instruments such as mortars and pestles are used to grind or homogenize the specimens. First, the specimens are deposited into a mortar (receptacle), a buffer solution is added therein. Then, the tissue sample is manually grinded with a pestle. This conventional method requires significant labor manual and only one sample can be done at a time. These mortars and pestles are made of non-metal materials to be cost effective and convenient, and to avoid contamination by nano-sized metal particles.

In the U.S. Pat. No. 5,829,696 entitled "Sealed Grinding and Homogenizing Apparatus" to DeStefano et al. (hereinafter referred to as "the DeStefano patent"), an apparatus for grinding specimens comprising a container, a grinder, and a grinding head is disclosed. The grinding head is designed to prevent the specimens from escaping and thus from causing cross-contamination. In the DeStefano patent, the replaceable grinding head seals the top side of grinding tube so that the specimens cannot splash out escaping and contaminating the surrounding laboratory environment and/or neighboring grinding tubes. However, the DeStefano patent does not disclose simultaneously grinding or homogenizing multiple grinding tubes at the same time. Thus, DeStefano's grinding apparatus is still performed manually and inefficient. Furthermore, the DeStefano's grinding apparatus does not prevent cross contamination when some of the debris on the grinding tube escape as the grinding tubes are pulled out after the homogenizing process is complete. In addition, contamination may be caused by aerosolization that carries droplets of specimens to the neighboring containers. In case of grinding infectious specimens such as samples containing the COVID-19 or SARS-COV-2 virus for biological testing purposes, aerosolization could spread of this dangerous virus.

In another U.S. Patent Application number US-2007/0262181, entitled, "Device and Method for Grinding Biological Samples" by Cazrnek (hereinafter referred to as "Caznek's application"), an electrical sample grinding device is disclosed. The Caznek's grinding apparatus as shown in FIG. 1 includes a ball bearing 4 mounted on a shaft, and a drive mechanism (a motor, FIG. 8 in the Caznek's application). The ball bearing] end of shaft is inserted in an open end of a sample tube having a conical or concave-shaped interior bottom wall opposite the open end. However, the Caznek's grinding apparatus does prevent cross contamination when some of the debris on the shaft escape as shaft are pulled out of the sample tube. Furthermore, the Caznek's application fails to teach grinding multiple samples using multiple tubes at the same time. Please see Caznek's FIG. 9. Therefore, the Caznek's grinding apparatus is still inefficient.

In a more recent U.S. Pat. No. 9,556,410, entitled, "Homogenizer and Storage Cooler" to Jindo et al. (hereinafter referred to as "the Jindo's patent"), an electrical homogenizer and storage cooler is disclosed which includes: a main body, a storage cooler. The storage cooler is configured to cool a tissue sample in a sample container. Even though Jindo's patent teaches homogenizing a multiple of samples using electrical power (see Jindo' FIG. 10, step S1), the cross contamination between samples in adjacent tubes (see FIG. 6) cannot be prevented as the blenders are withdrawn. Furthermore, the Jindo's homogenizer 1 is complicated, expensive, and cannot grind a large number of samples with its horizontal arrangement as shown in FIG. 9.

In an international patent application No. WO 02/48679, entitled, "Device for Deintegrating Biological Samples" by Gianmarco Roggero (hereinafter referred to as "the Roggero's application"), a disintegrating device is disclosed which includes a container, a shaft mounted for rotation inside the container with a blade on the end inside container. The shafts are coupled together by ball coupling means (metal balls), and frusto-conical cavity. Even though the Roggero's device can grind multiple samples at the same time, it requires four separate motors ("deconstituting devices are aligned with the four electric motors (FIG. 2c)", the Roggero's application, page 7), thus energy inefficient. Furthermore, the Roggero's device cannot prevent cross contamination of samples as engagement means and shafts are withdrawn from container. Additionally, the Roggero's device is arranged horizontally as shown in FIG. 3a and FIG. 3b, occupying a large lab bench's spaces with only four samples being deconstructed at a time.

Thus, what is needed is a grinding and homogenizing apparatus that can operate on multiple samples at the same time without using more than one electrical motors.

What is needed is a grinding and homogenizing apparatus that can prevent cross contamination to the specimens in the neighboring containers or receptacles as the pestles are pulled out after the grinding operation is completed.

Additionally, what is needed is a grinding and homogenizing apparatus that is geometrically arranged to hold the most number of sample containers without occupying a large surface area of the laboratory bench.

What is needed is a grinding and homogenizing apparatus that can effectively avoid the aerolization that could propagate droplets of samples throughout the laboratory environment.

Additionally, what is needed is a grinding and homogenizing apparatus that can evenly and thoroughly grind and homogenize laboratory samples.

What is needed is a grinding and homogenizing apparatus that can be electronically controlled in duration and speed to achieve precise grinding and homogenizing.

What is needed is a grinding and homogenizing apparatus that has electronic memory to achieve accurate homogenizing and grinding of the same samples consistently every time.

What is needed is a grinding and homogenizing apparatus that is cost-effective, easy to handle, and energy efficient.

Furthermore, what is needed is a grinding and homogenizing apparatus that can achieve the above needs and functions with simple design and assembly.

The grinding and homogenizing apparatus of the present invention meets the above needs.

SUMMARY OF THE INVENTION

The present invention has been made in view of the aforementioned circumstances, and therefore, an object of the present invention is to provide a novel laboratory sample grinder designed to prevent cross contamination between samples.

An object of the present invention is to provide a laboratory sample grinder which includes: a controller unit having a motor and a controller unit; a tube receptacle unit, removably laid on top of the controller unit, comprising a plurality of compartments designed to contain a plurality of laboratory tubes; and a top housing unit, removably laid on top of the tube receptacle unit, comprising an array of pestles coupled to a gear system operated by the motor, wherein the top housing unit comprises a handle when rotated operable to eject the array of pestles into said plurality of laboratory tubes.

An object of the present invention is to provide a method of grinding/milling/homogenizing multiple laboratory samples without cross-contamination including: (a) lining up an array of mortars containing laboratory samples with an array of pestle ejecting pins so that when being pressed by a ramp connector the array of pestles falls completely into an array of mortars; (b) maintaining the array of pestles, the array of mortars, and the array of pestle ejecting pins lined up using a pair of male lock key and female lock key; and (c) starting grinding a plurality of samples using a single motor and a planetary gear system.

Another object of the present invention is to provide a laboratory grinder that is energy efficient; that is a lab sample grinder that grinds/mills/homogenizes multiple samples without using more than one electrical motor.

Another object of the present invention is to achieve cross-contamination free lab sample grinding/milling/homogenizing apparatus using a simple system of pestle ejecting pins.

The above objectives are achieved by providing a method of manufacturing an efficient and cross-contamination free laboratory sample grinder which comprises: (a) preparing ejecting means for ejecting an array of pestles into an array of mortars; (b) calculating distances between the pestles in the array of pestles, and those between mortars in the array of mortars; and (c) preparing a locking means so that when the grinder is in the lock state the array of pestles, the array of mortars, and the ejecting means are lined up.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 3A is a 3D diagram illustrating the three housing units of the lab sample grinder in an open state in accordance with an exemplary embodiment of the present invention;

FIG. 3B is a 3D blow-up diagram of the interior space of the third housing unit showing the distal end of the pestle rod in accordance with an exemplary exemplary embodiment of the present invention;

The figures depict various embodiments of the technology for the purposes of illustration only. A person of ordinary skill in the art will readily recognize from the following discussion that alternative embodiments of the structures and methods illustrated herein may be employed without departing from the principles of the technology described herein.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
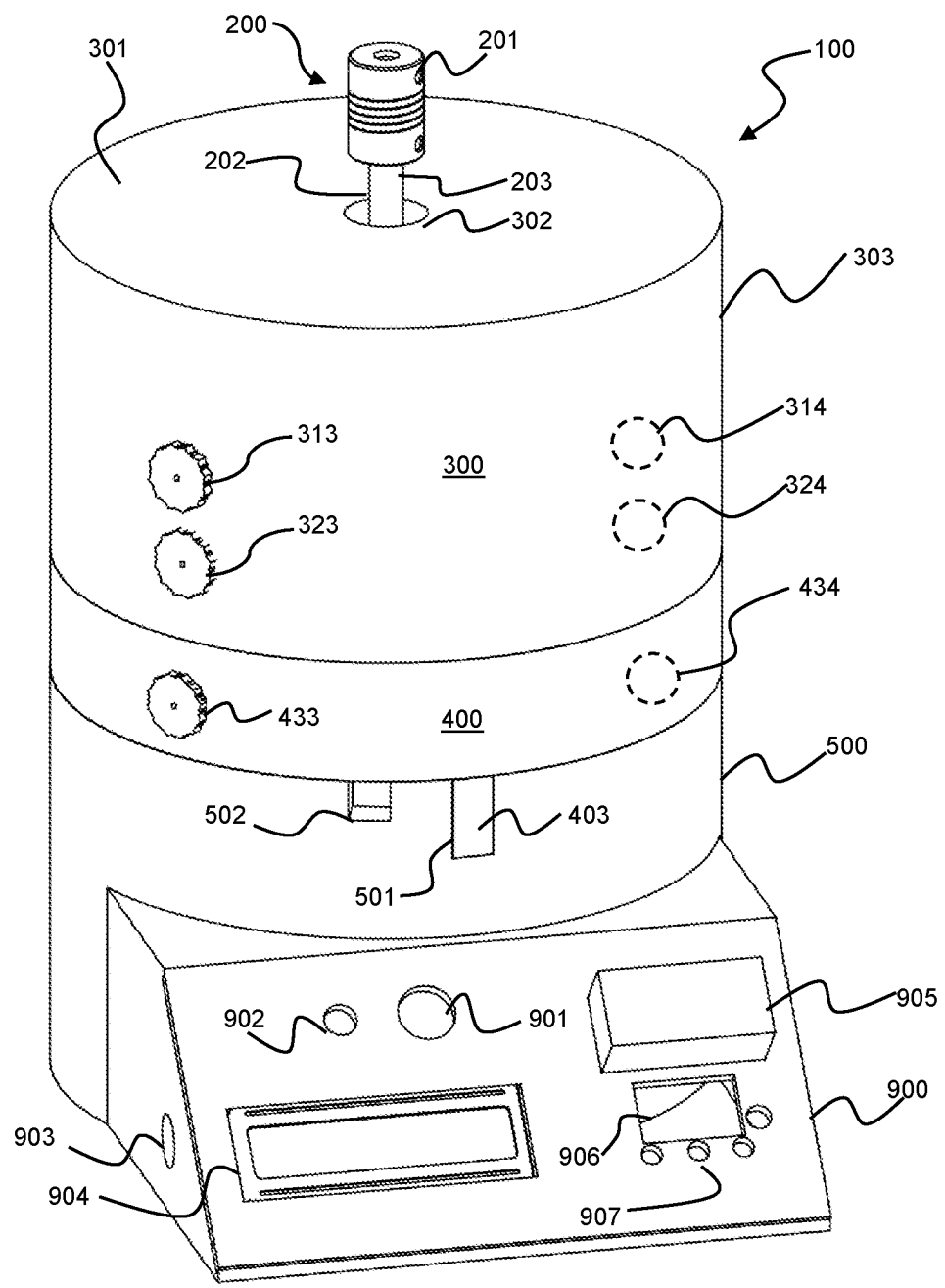
FIG. 1 is a 3D diagram illustrating a cylindrical structure of the laboratory grinding/milling/homogenizing apparatus ("lab sample grinder") in accordance with an exemplary embodiment of the present invention.

Now referring to FIG. 1, a 3D diagram of a cylindrical shaped laboratory sample/grinding/homogenizing device (lab sample grinder) 100 of an exemplary embodiment of the present invention is illustrated. Lab sample grinder 100 includes—from the bottom up—a controller unit 900, a third housing unit 500, a second housing unit 400, a first housing unit 300, and a main shaft 200. As shown, main shaft 200 includes a handle 201 releasably connected to an axle 202 which functions as the main actuator of the grinding/milling/homogenizing operations. The complete structure and functions of main shaft 200 will be shown and disclosed in FIG. 2. First housing unit 300 has a cylindrical structure with a thru hole 302 formed at the center of its top side 301. A pair of first position fixing screws 313-314 and a pair of second position fixing screws 323-324 are conveniently located on the lateral side of first housing unit 300. First position fixing screws 313-314 are located opposite to each other. Second position fixing screws 323-324 are located opposite to each other and below first position fixing screws 313-314. In many advantageous embodiments of the present invention, second housing unit 400 has an alignment lock key 403 projecting downward from the bottom side. Alignment lock key 403 plays a very important role to lab sample grinder 100 because it is designed to cause different important internal components of lab sample grinder 100 to precisely line up. Alignment lock key 403 ensures proper operations of lab sample grinder 100 and prevents cross contamination between samples. The working principle of alignment lock key 403 will be described herein and below. In some other embodiments, second housing unit 400 also has a third pair of position fixing screws 433-434 which is position in opposite side to each other. Third housing unit 500 has an alignment lock receiver 501 and a post-op unlock receiver 502. During grinding/milling/homogenizing operations, alignment lock receiver 501 is mated with alignment lock key 403, lining up different components inside of lab sample grinder 100. When finished, post-op unlock receiver 502 is mated with alignment lock key 403, readying the mortars of samples to be removed without cross contamination. In many embodiments of the present invention, both alignment lock key 403 and alignment lock receiver 501 have rectangular shape with equal length. However, post-op unlock receiver 502 also has a rectangular shape but is shorter in length, making the post-operation removing and cleaning up more convenient.

Continuing with FIG. 1, controller unit 900 is mechanically secured to third housing unit 500. On the front façade, controller unit 900 includes an ON/OFF button 901, a speed dial knob 902, a display unit 904, an operation time setting unit 905, a digital running time display unit 906, and a warning light emitting diode (LED) 907. On the lateral side, an electrical connector 903 provides electrical power supplies to controller unit 900. In some embodiments of the present invention, electrical connector 903 is a Universal Serial Bus (USB). In some other embodiments, electrical connector 903 is a typical male-female IEC 320 connectors. In some other embodiments, electrical connector 903 is male DC power jack plugs of various sizes from 0.6 mm to 2.1 mm. In some aspects of the present invention, controller unit 900 also has an input/output communication device (shown in FIG. 11) that enables lab sample grinder 100 to communicate with external devices (shown in FIG. 11).

Figure 2A:
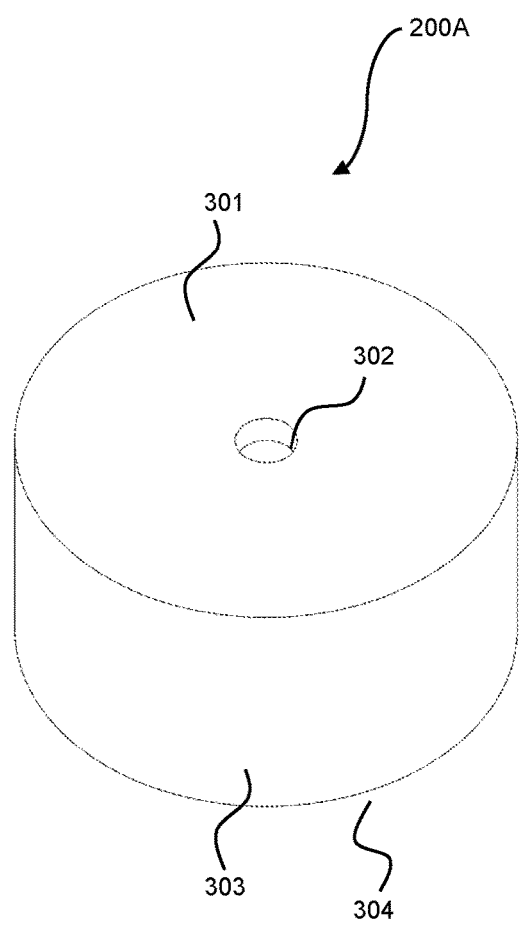
FIG. 2A-2B is a 3D diagram showing the internal and external structures and different components of the first housing unit including an array of pestles ejecting pins in accordance with an exemplary embodiment of the present invention.
Figure 2B:
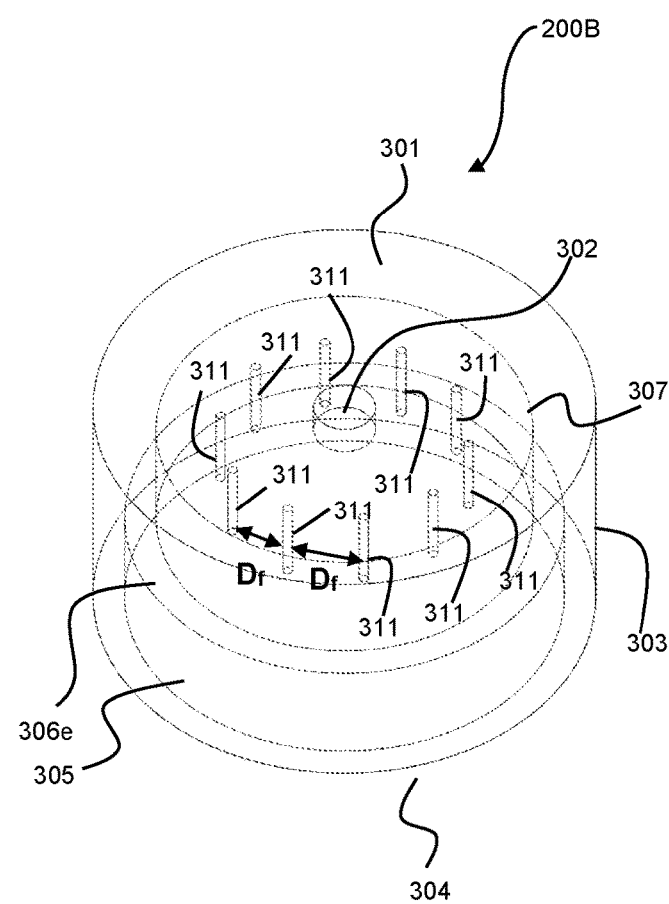

Now referring to FIG. 2A, a 3D diagram of an external structure 200A of first housing unit 300 is illustrated. Externally, first housing unit 300 is uniformly cylindrical in shape with top side 301, lateral side 302, and a first foot base 304. Thru hole 302 is formed at the center of top side 301. In FIG. 2B, a 3D diagram of an interior structure 200B of first housing unit 300 is presented which includes a first bottom interior segment 305 is concentrically laid below a first top interior segment 307 with different girth (surface) diameters, creating a first interior collar 306e. On the ceiling inside first top interior segment 307, an array of pestle ejecting pins 311 is arranged in a circular formation with predetermined equidistance $D_f$ between them. In some exemplary embodiment of the present invention, first housing unit 300 has a surface diameter of 160 millimeters (mm) and a height of 85 mm. Each pestle ejecting pin 311 has a diameter of 2 mm and a height of 11 mm. One end of each pestle ejecting pin 311 is fixedly connected to the ceiling inside first top interior segment 307 and the other end is pointing vertically downward, designed to make contact with the base of each pestle rod 801.

Next referring to FIG. 3A, a 3D diagram 300A of the top three housing units of the lab sample grinder in an open state in accordance with an embodiment of the present invention is illustrated. Second housing unit 400 has two concentric cylindrical segments with different girth (surface) diameters. A second bottom segment 402 and a second top segment 401. Second bottom segment 402 has a larger girth diameter than that of a second top segment 401, thus forming a second collar 402e. Second bottom segment 402 has the same surface diameter as that of first bottom interior segment 305 so that the exterior surfaces of two housing units 300 and 400 are flushed, creating a taller cylindrical shape. Second bottom segment 402 has a surface diameter of 160 mm. However, second top segment 401 has a slightly smaller surface diameter than that of first top interior segment 307. The surface diameter of second top segment 401 is designed to be 140 mm so that second top segment 401 can slide pass and be inserted inside first top interior segment 307. Second top segment 401 has a fifth and a sixth screw holes 453 and 454 for locking with a third pair of position holding screws 433 and 434 respectively. Similarly, third housing unit 500 also has a cylindrical shape with a third bottom segment 510 concentrically aligned with a third top segment 511. Third bottom segment 510 has the same surface diameter as those of second bottom segment 402 and first bottom interior segment 305, which is 160 mm, so that they form a higher and externally smooth cylindrical shape when assembled together. As alluded above, the bottom side of second bottom segment 402 has lock alignment key 403 that is either mated with either alignment lock receiver 501 or post-op unlock receiver 502, depending on the operating stage of lab sample grinder 100.

Continuing with FIG. 3A, a first insertion disc 410 and a second insertion disc 420 are removably held to axle 202 and at the same time sandwich a planetary gear system 1000 therebetween. On the opposite sides of second insertion disc 420, there are a second pair of screw holes 423-424 for connecting with second pair of position fixing screws 433-434. When first housing unit 300, second housing unit 400, and third housing unit 500 are stacked together, they are automatically in the line-up state. It is noted that the terms "lined up", "lined up state", or "lock state", or "in a lock state" when used within the present Disclosure mean that first pair of position locking screws 313-314 can be tightly connected to first pair screw holes 413-414 without causing any deformation in geometrical shape, damages, and position misalignment to first insertion disc 410; second pair of position locking screws 323-324 can be tightly connected to first pair screw holes 423-424 without causing any deformation in geometrical shape, damages, and position misalignment to second insertion disc 420; and third pair of position locking screws 433-434 can be tightly connected to third pair screw holes 453-454 without causing any deformation in geometrical shape, damages, and position misalignment to first housing unit 300 and second top segment 401. Any devices, means, systems, or apparatuses that cause these "lined up", "lined up state", or "lock state", or "in a lock state" are within the teachings of the present disclosure.

In FIG. 3B, a blow-up diagram 300B of an interior space of third housing unit 500 is presented to show the distal end of main shaft 200. The distal end of main shaft 200 is a tip 205 for removably connecting to a motor connector 206 which, in turn, fixedly connected to a motor 207. Motor connector 206 functions to prevent main shaft 200 from freely moving pass second housing unit 400. Motor connector 206 uses means such as detente ball lock mechanism, friction lock, or threaded fastener. During grinding/milling/homogenizing operations, main shaft 200 remains locked to motor 207 of controller unit 900. In the detente ball lock mechanism, handle 201 is pressed down to push or withdraw a pair of steel balls into or from the locking positions. In the friction lock mechanism, tip 205 is shaped in a rectangular geometry which is snugly inserted into holding connector 206 which has the same rectangular receiving end. In the threaded fastener, handle 201 is twisted to screw on or screw off axle 202 into or out of holding connector 206 respectively. Other locking mechanisms which can connect or remove axle 202 to holding connector 206 are also within the scope of the present invention. It is appreciated by a person of ordinary skills in the art that connections between tip 205 of axle 202 and holding connector 206 described herewith may be by any other suitable means such as nails, screws, bolts, connectors, pins, staples, dowels or the likes.

Figures 4A, 4B:
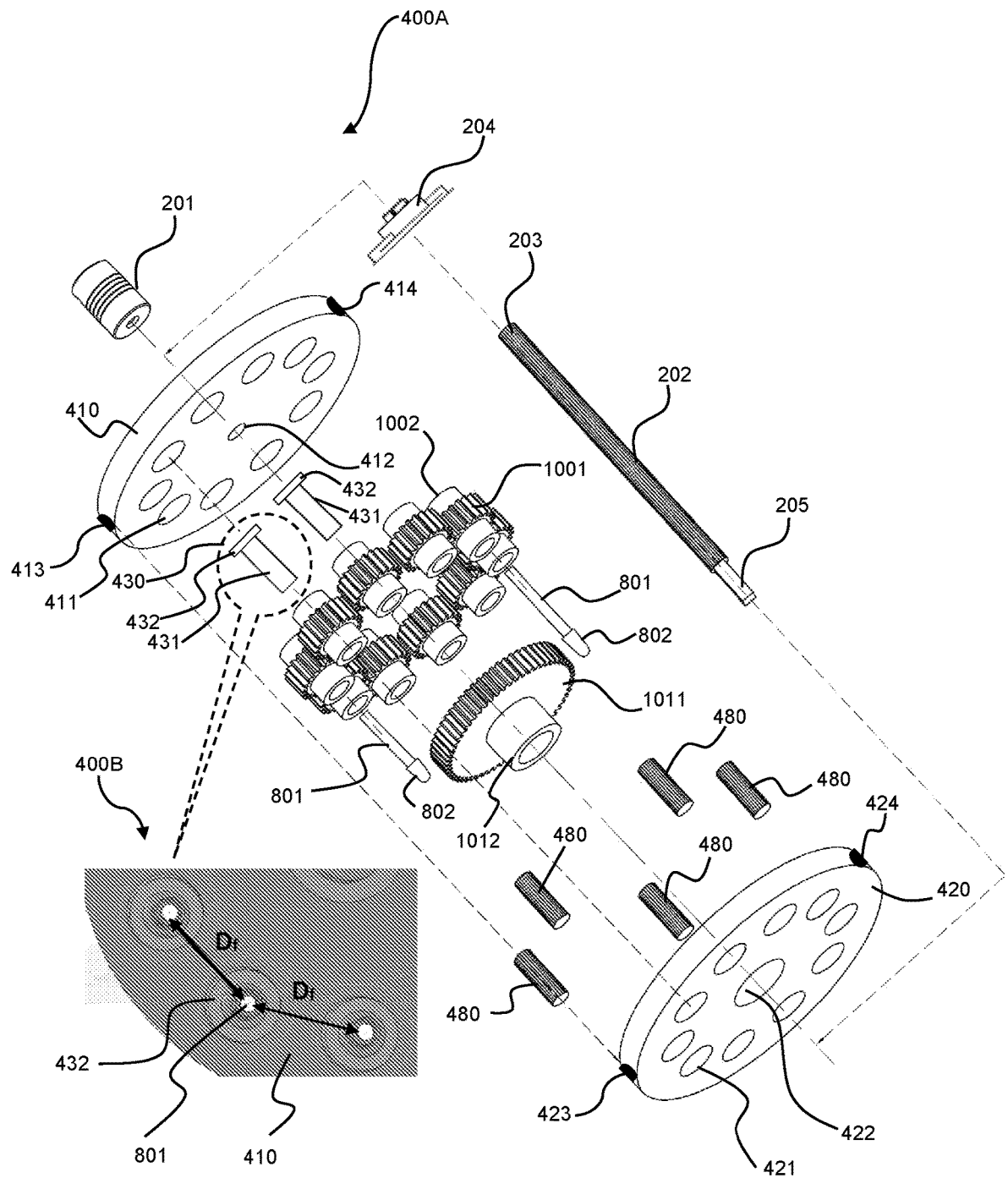
FIG. 4A is a 3D diagram showing the internal components contained the second housing unit of the lab sample grinder in accordance with an exemplary embodiment of the present invention.
FIG. 4B is a top-down view of a unit of a first insertion disc illustrating the manner pestles are inserted, lined up, and held firmly inside each pestle hole in accordance with an exemplary embodiment of the present invention.

Referring next to FIG. 4A, a 3D diagram 400A showing various internal components contained in second housing unit 400 of lab sample grinder 100 in accordance with an embodiment of the present invention is illustrated. The description of main shaft 200 is now continued: Main shaft 200 includes a proximate end 203, axle 202, and distal end which is tip 205 having smaller surface area and different geometrical shape than that of axle 202. Proximate end 203 is connected to handle 201 and a squeeze disc lock 204. Handle 201 is made of steel or aluminum with a diameter of 20 mm and a height of 25 mm. Axle 202 is made of steel and has a diameter of 8 mm with a length of 100 mm. Next, near the perimeter edge of first insertion disc 410 locates a first circular array of pestle insertion holes 411 arranged around a first shaft insertion hole 412. First insertion disc 410 is made of aluminum with a diameter of 120 millimeters (mm) and thickness of 10 mm. Each of first array of pestle insertion holes 411 has a diameter of 16 mm while first shaft insertion hole 412 has a larger diameter of 82 mm. On the opposite sides of first insertion disc 410, first pair of screw holes 413 and 414 designed to line up and connect to first pair of position fixing screws 313-314 respectively. Similarly, near the perimeter edge of second insertion disc 420 includes a second circular array of pestle insertion holes 421 arranged around a second shaft insertion hole 422. Second insertion disc 420 is made of aluminum with a diameter of 120 millimeters (mm) and thickness of 10 mm. Each of second array of pestle insertion holes 412 has a diameter of 16 mm while second shaft insertion hole 422 has a larger diameter of 25.5 mm. On the opposite sides of second insertion disc 420, second pair of screw holes 423 and 424 designed to connect to second pair of position fixing screws 323-324 respectively.

Continuing with the discussion of FIG. 4A, planetary gear system 1000 including driven gear 1001 arranged into a circular trajectory which is in teeth communication with a driving gear 1011 at the center. Driving gear 1011 is designed to have 60 teeth, diameter of 60 mm, and a thickness of 5 mm. A central bearing 1012 firmly connects driving gear 1011 with axle 202 so that when axle 202 is rotated by motor 207 driving gear 1011 also rotates. Consequently, array of driven gears 1001 rotates at a speed equal to the speed of driving gear 1011 multiplied by the ratio of number of teeth of driving gear 1011 over that of driven gear 1001. Each driven gear 1001 is also supported by a bearing 1002 and has a diameter of 20 mm and thickness 5 mm with 20 teeth. With this exemplary embodiment, if the speed of motor 207 is 1231 rpm for an operation time of 15 minutes, the speed of each driven gear 1001 is 3,693 rpm (1231×60/20) for 15 minutes. All bearings 1011 and central bearing 1012 are hollow tubes where pestles 810 are inserted therethrough. Spacers 480 are screwed in to secure first insertion disc 410 and second insertion disc 420 in parallel to each other-which means that first array of pestle insertion holes 411 is lined up with second array of pestle insertion holes 422 and first central shaft insertion hole 412 is lined up with second central shaft insertion hole 422. Additionally, spacers 480 are purported to hold the distance between two discs 410 and 420 constant. As such, planetary gear system 1000 is secured inside. Each spacer 480 has a surface diameter of 5 mm and height 12 mm. Within the meaning of the present invention, the "in position", "in place", "in lock", or "lock in" means that every components described above are lined up precisely so that lab sample grinder 100 operates properly as it is intended to do without causing damages, misalignments, deformations thereto.

In FIG. 4B, an exploded top down view 400B of a unit of first insertion disc 410 is illustrated. From top-down view 400B, mounting sleeves 430 are used to mount and firmly hold pestles 810 inside bearing 1002. In many different embodiments of the present inventions, each mounting sleeve 430 includes a tubular body 431 and a flange 432, all are hollow and precisely measured so that tubular body 431 fits snugly inside bearings 1002. As alluded above, the centers of two adjacent pestle rods 801 have the distance of $D_f$ which is precisely the same as that between two adjacent pestle ejecting pins 311. First, mounting sleeves 430 are inserted through first pestle insertion holes 411 with tubular bodies 431 pointing vertically downward toward bearing 1002. Pestle rods 801 are pressed into second pestle insertion holes 421 into tubular body 431 until the bases of pestle rods 801 emerge in flush with the surface of first insertion disc 410 as shown in diagram 400B.

Figure 5:
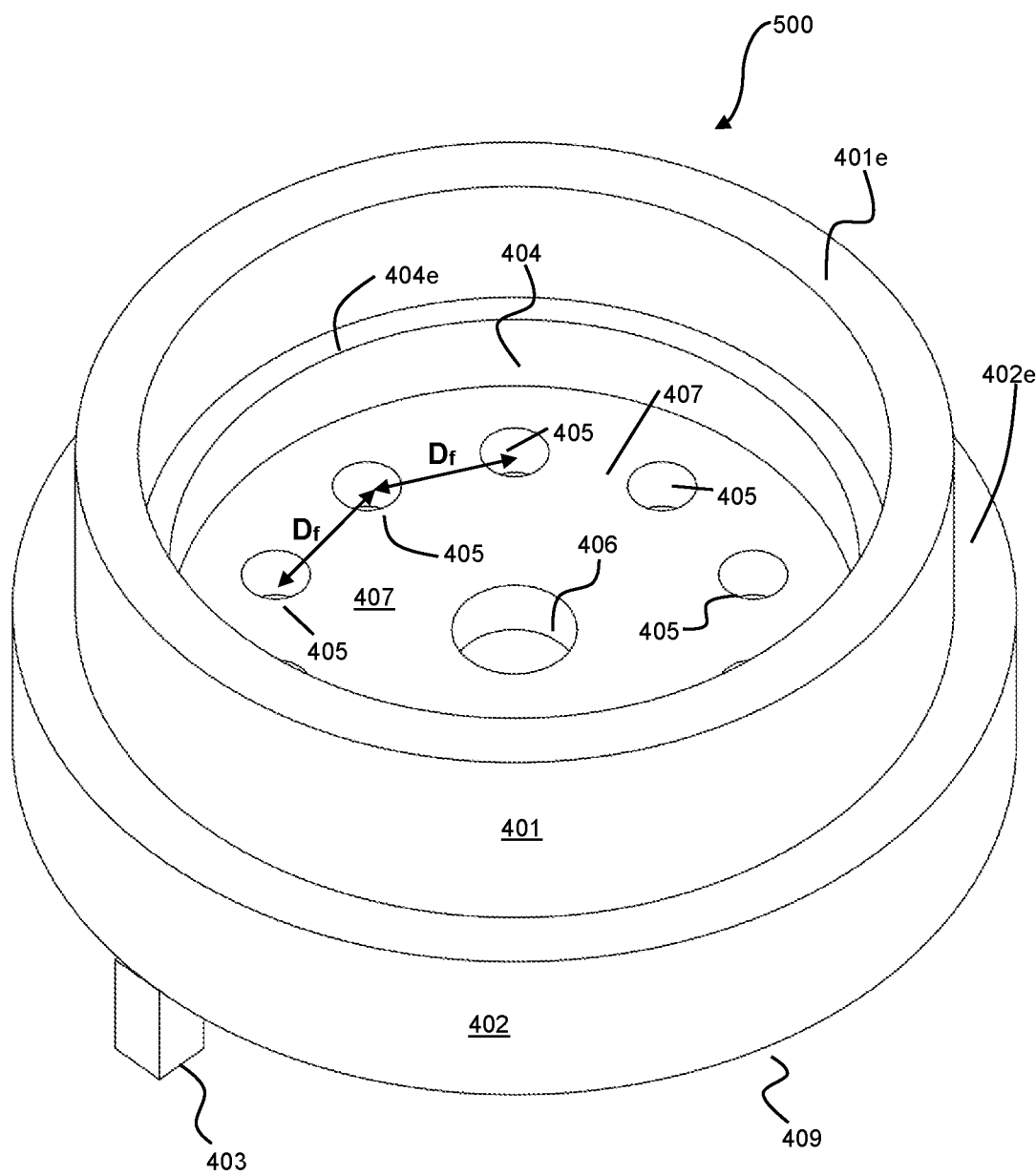
FIG. 5 is a 3D diagram illustrating a geometrical structure of the second housing unit of the lab sample grinder in accordance with an exemplary embodiment of the present invention.

Next referring to FIG. 5, a 3D diagram 500 representing the geometrical shape and structure of second housing unit 400 of lab sample grinder 100 in accordance with an embodiment of the present invention is illustrated. When disassembled to an individual component, second housing unit 400 is a hollow cylindrical structure which includes second top segment 401 laid concentrically on top of second bottom segment 402, thus forming second collar 402e. Second top segment 401 is itself a hollow cylinder with a surface diameter of 140 mm and a height of 35 mm. The top rim surface of second top segment 401 is a second top rim 401e. A bottom divider 407 includes a first array of mortar insertion holes 405 arranged around a third shaft insertion hole 406. Each mortar insertion hole 405 has a diameter of 11 mm. On the bottom side of second bottom segment 402, alignment lock key 403 is attached and pointing vertically downward. The distances between the centers of any two adjacent mortar holes 405 are $D_f$ so that first array of mortar insertion holes 405 lines up precisely with first array of pestle insertion holes 411 and second array of pestle insertion hole 421 when alignment lock key 403 is mated with alignment lock receiver 501. As such, first shaft insertion hole 412, second shaft insertion hole 422, and third shaft insertion hole 406 are also lined up precisely. Inside second top segment 401, a second interior segment 404 having a smaller surface diameter is formed to create an interior edge 404e. When lined up, first insertion disc 410, planetary gear system 1000, and second insertion disc 420 rest on interior edge 404e and are stored completely inside the interior space of second top segment 401.

Figure 6:
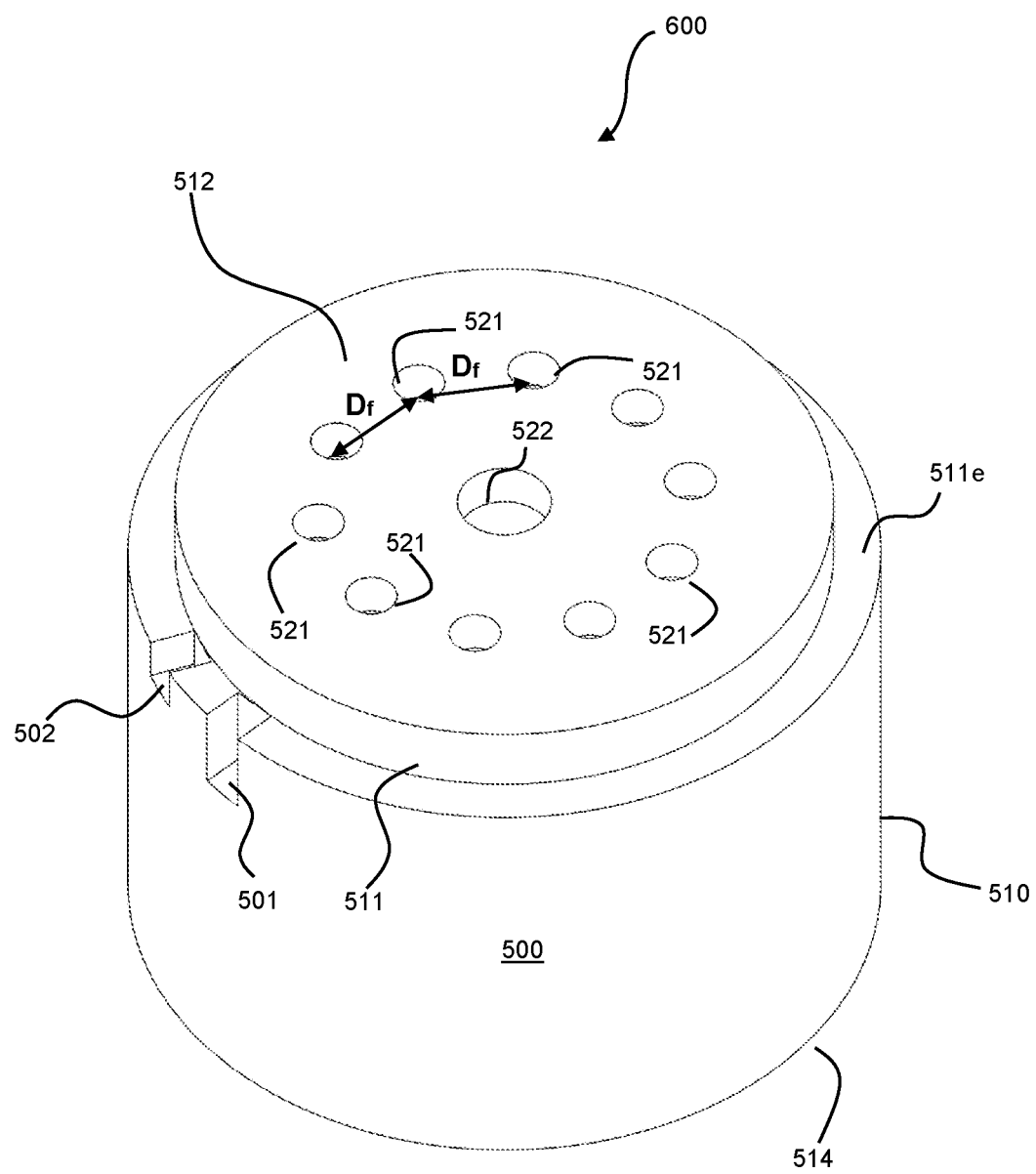
FIG. 6 is a 3D diagram illustrating a geometrical structure of the third housing unit of the lab sample grinder in accordance with an exemplary embodiment of the present invention.

Referring now to FIG. 6, a 3D diagram 600 representing a geometrical structure and measurements of the third housing unit 500 of lab sample grinder 100 in accordance with an embodiment of the present invention is illustrated. When disassembled to an individual component, third housing unit 500 is a hollow cylindrical structure which includes third top segment 511 laid concentrically on top of third bottom segment 510. Third bottom segment 510 has a surface (girth) diameter of 160 mm and a height of 30 mm. Third top segment 511 functions as a fourth insertion disc whose a top surface 512 has a surface (girth) diameter of 140 mm. Third top segment 511 is the structured substantially similar to first insertion disc 410 and second insertion disc 420. A third collar 511e is formed around the base of third top segment 511. On third top surface 512, a second array of mortar insertion holes 521 is arranged a fourth shaft insertion hole 522 and in the same fashion, dimension, and measurements as first array of mortar insertion holes 405 around so that they are all lined up precisely when alignment lock key 403 is mated with alignment lock receiver 501. Right next to the base of third top segment 511, alignment lock receiver 501 and post-op unlock receiver 502 are edged onto third collar 511e of third bottom segment 510. The bottom side of third bottom segment 510 is a third foot base 514.

Figure 7:
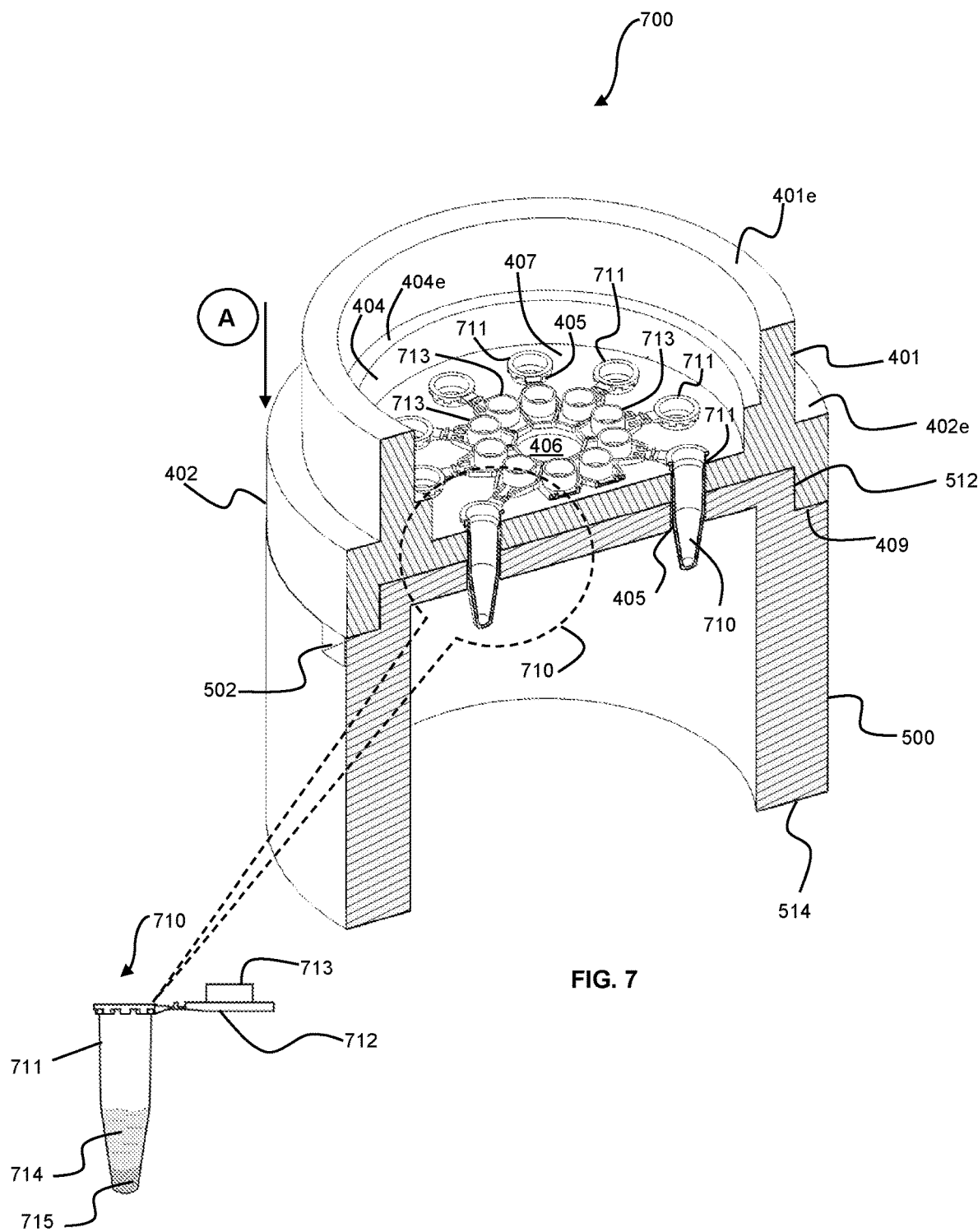
FIG. 7 is a 3D cutaway diagram illustrating the mating state between the second housing unit and the third housing unit the specimen mortars (containers) of the lab sample grinder in accordance with an exemplary embodiment of the present invention.

In FIG. 7, a 3D cutaway diagram 700 illustrating the line-up state between second housing unit 400 and third housing unit 500 of lab sample grinder 100 in accordance with an embodiment of the present invention is illustrated. In diagram 700, a vertical cut away is performed right after alignment lock key 501 creating a coronal plane elucidating the manner array of Eppendorf tubes 710 are inserted into first array of mortar insertion holes 405. In various embodiments of the present invention, a lock state or line-up state is achieved by an A motion. A motion is a stacking or vertically pressing down action. When A motion is performed, second housing unit 400 is stacked on top of third housing unit 500 as alignment lock key 403 is mated with alignment lock receiver 501. As such, the following line-up occurs: a second foot base 409 of second bottom segment 402 is rested on a third collar 511e of third top segment 511. Afterwards, an array of Eppendorf tubes 710 is inserted into first array of mortar insertion whole 405. In one exemplary embodiment of the present invention, Eppendorf tube 710 is a test tube 10 mL non-spilled specimen container which includes a hinged lid 712 connected to a mortar 711. Hinged lid 712 includes a seal cap 713 hinged to mortar 711, it hermetically seals off laboratory specimens including solvent 714 and sample 715 inside. In a non-limiting example, each array of tubes 710 is manufactured under UNSPSC code 410000000 and has a part number of NTK-TTSR. Each tube in an array of Eppendorf vails 710 may be manufactured according to other industrial standards such as from Corning® or Pyrex®. It is noted that other types of tubes, lab sample containers, sample collectors, test kits and their respective dimensions and standards are within the scope of the present invention.

Figure 8:
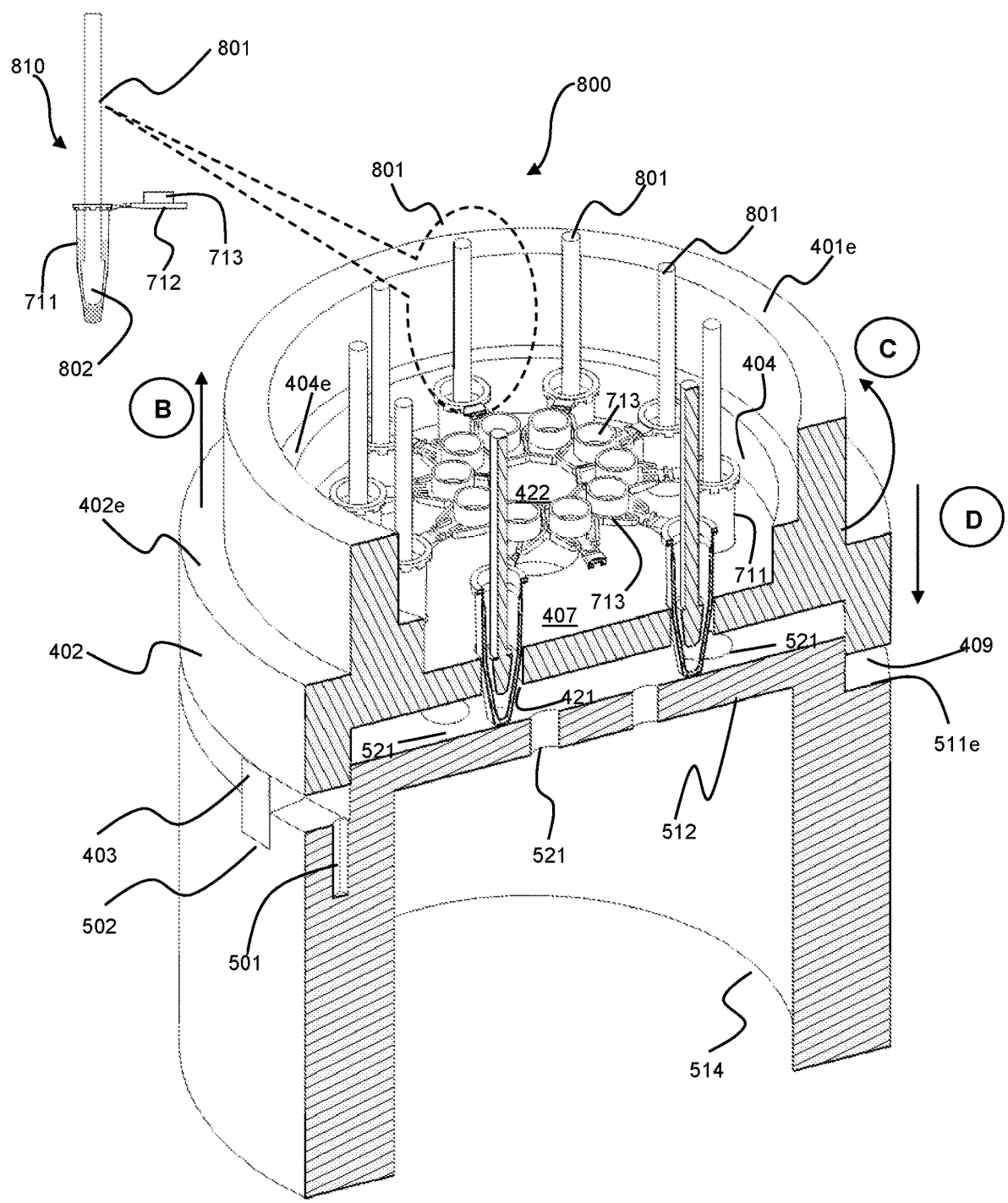
FIG. 8 is a 3D cutaway diagram illustrating the relative positions of the second housing unit, the third housing unit, and the pestles and mortars when they are in the disconnection state in accordance with an exemplary embodiment of the present invention.

Referring next to FIG. 8, a 3D cutaway diagram 800 illustrating the relative positions of second housing unit 400, third housing unit 500, and array of Eppendorf tubes 710 when they are disassembled in accordance with an embodiment of the present invention is illustrated. Each of array of pestles 810 has a pestle rod 801 and a bulging header 802 with larger girth diameter.

After the grinding/milling/homogenizing of specimens 715 is completed, alignment lock key 403 is lifted off completely from alignment lock receiver 501 in accordance to a motion indicated by an alphabet B, simultaneously removing array of Eppendorf tubes 710 from second array of mortar insertion holes 521. Then second housing unit 400 is slightly rotated either clockwise or counterclockwise to create a misalignment state or a non-lineup state, indicated by a motion C. Accordingly, the bases of array of Eppendorf tubes 710 is rested completely on the top surface of third top segment 511. Finally, alignment lock key 403 is mated with post-op unlock receiver 502. Since the length of alignment lock key 403 is greater than that of post-op unlock receiver 502 by an amount carefully designed beforehand, the bases of array of Eppendorf tubes 710 are now pushed upward by the surface of third top segment 511, losing the array of mortars 711 from the grip of second array of mortar insertion holes 521. This push up to eject motion is indicated by a motion D.

Figure 9:
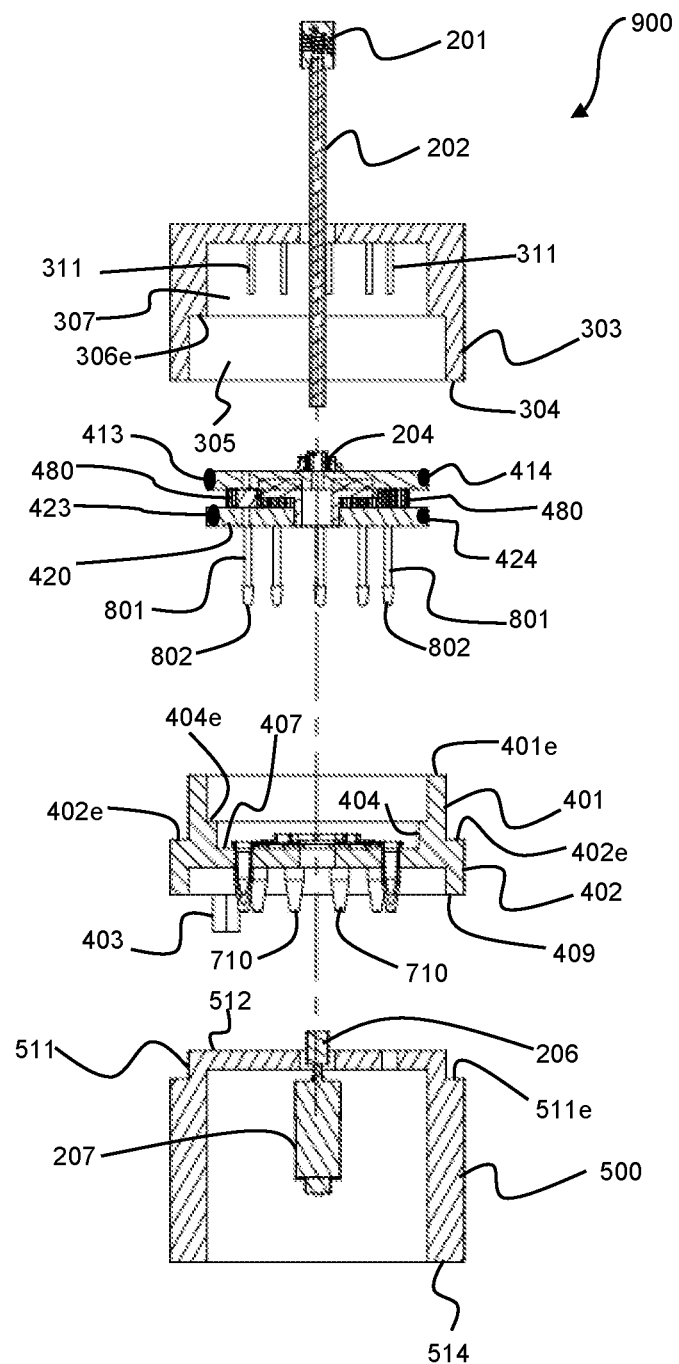
FIG. 9 is 2D diagram illustrating the complete structure and components inside the first housing unit, the second housing unit, and the third housing unit of the lab sample grinder in accordance with an exemplary embodiment of the present invention.

Referring next to FIG. 9, 2D diagram 900 illustrating the complete structure, components, assembling as well as disassembling instructions of first housing unit 300, the second housing unit 400, and the third housing unit 500 of lab sample grinder 100 in accordance with an embodiment of the present invention is illustrated. First, planetary gear system 1000 is assembled as discussed above in FIG. 4. Briefly reviewing, planetary gear system 1000 is placed between first insertion disc 410 and second insertion disc 420 and secured firmly together using spacers 480. From the top side, mounting sleeves 430 are inserted into first array of pestle insertion holes 411. From the bottom side, array of pestles 810 are inserted into second array of pestle holes 421 until pestle rod 801 appears on the surface of first insertion disc 410 as shown in FIG. 4B. Next, array of mortars 711 are inserted one-by-one into array of mortar insertion holes 405 from the top of surface of bottom divider 407. Then, second housing unit 400 is placed on top of third housing unit 500 so that alignment lock key 403 is mated with alignment lock receiver 501, which is accomplished by motion A. Consequently second foot base 409 rests on third collar 511e. The outer edges of both second housing unit 400 and third housing unit 500 are lined up in flush alignment. Next, planetary gear system 1000 sandwiched between first insertion disc 410 and second insertion disc 420 secured together by spacers 480 is placed inside second housing unit 400. Main shaft 200 is inserted through thru hole 302, planetary gear system 1000 via first shaft insertion hole 412, second shaft insertion whole 422, third shaft insertion hole 406, and fourth shaft insertion hole 522. By then, the bottom surface of second insertion disc 420 rests firmly on interior edge 404e so that each header 802 reaches to the bottom of each mortar 711. Next, first housing unit 300 is placed on top of second housing 400 so that first foot base 304 rests on second collar 402e. Internally, first interior collar 306e rests on second top rim 401e, and second foot base 409 rests on third collar 511e. Finally, main shaft 200 is pushed all the down to connect with motor connector 206. After this step, lab sample grinder 100 is lined up as shown in FIG. 1. After the grinding/milling/homogenizing operation, a user can grasp handle 201, unlock tip 205 from motor connector 206, and pull up main shaft 202 all the way by motion B so that the tips of ejecting pins 311 contact and push the bases of pestle rods 801 downward, ejecting array of pestles 810 into array of mortars 711, thus avoiding cross-contamination and aerosolization. Finally, motion C is performed to rest array of mortars 711 containing array of pestles 810; and motion D is performed to loosen array of mortars containing array of pestles 810 from the grips of first array of mortar insertion hole 405 and second array of mortar insertion holes 521. As seen from FIG. 1 to FIG. 9, the following objectives are achieved:

cross-contamination and aerosolization free using a simple system of geometrical line-up and pestle ejecting pins; and grinding/milling/homogenizing multiple samples without using more than one electrical motor.

Figure 10:
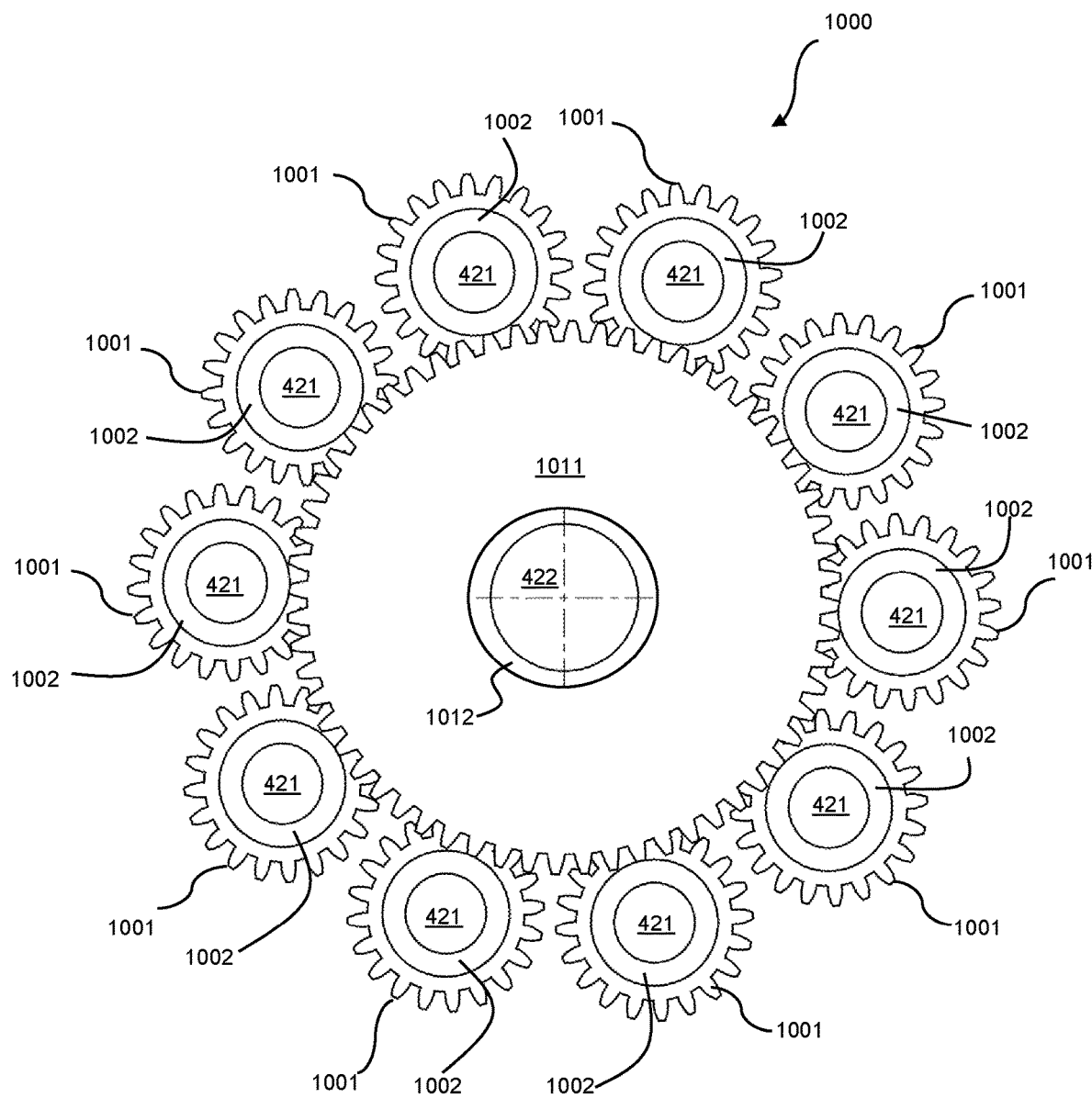
FIG. 10 is a top-down 2D diagram illustrating the structure of the planetary gear system used in the lab sample grinder in accordance with an exemplary embodiment of the present invention.

Next referring to FIG. 10, a top-down 2D diagram illustrating the structure of planetary gear system 1000 used in lab sample grinder 100 in accordance with an embodiment of the present invention is illustrated. Planetary gear system 1000 includes driving gear 1011—located at the epicenter—in teeth communication with satellite gears (also driven gears) 1011 around its outer perimeter like a sun in a solar system. Driving gear 1011 has a girth diameter of 60 mm with 60 teeth ($N_c=60$) and a thickness of 5 mm. In many embodiments of the present invention, there are 10 driven gears 1001, each having a girth diameter of 20 mm with 20 tooth ($N_p=20$) and a thickness of 5 mm. Driving gear 1011 has central bearing 1012 which is fit snuggly into second shaft insertion hole 422. Similarly, each driven gear 1001 has a bearing 1002 which is fit snuggly into second array of pestle holes 421. It is estimated that if the angular velocity of motor 207 is 1231 round per minute ($V_c=1231$ rpm), the angular velocity of each driven gear 1001 is 3693 rpm. $V_p=(N_c/N_p) V_c=1231$ rpm×3=3693 rpm.

Using planetary gear system 1000 in many embodiments of lab sample grinder 100 of the present invention achieves the following objectives:

(1) Energy efficient: using one motor to grind/mill/homogenize 10 pestle and mortar samples; and (2) The grinding angular velocities are amplified without using complicated and expensive electrical motors;

(3) Simple in design and cost effective because the present invention does not use many motors in a complex velocity amplification scheme.

Figure 11:
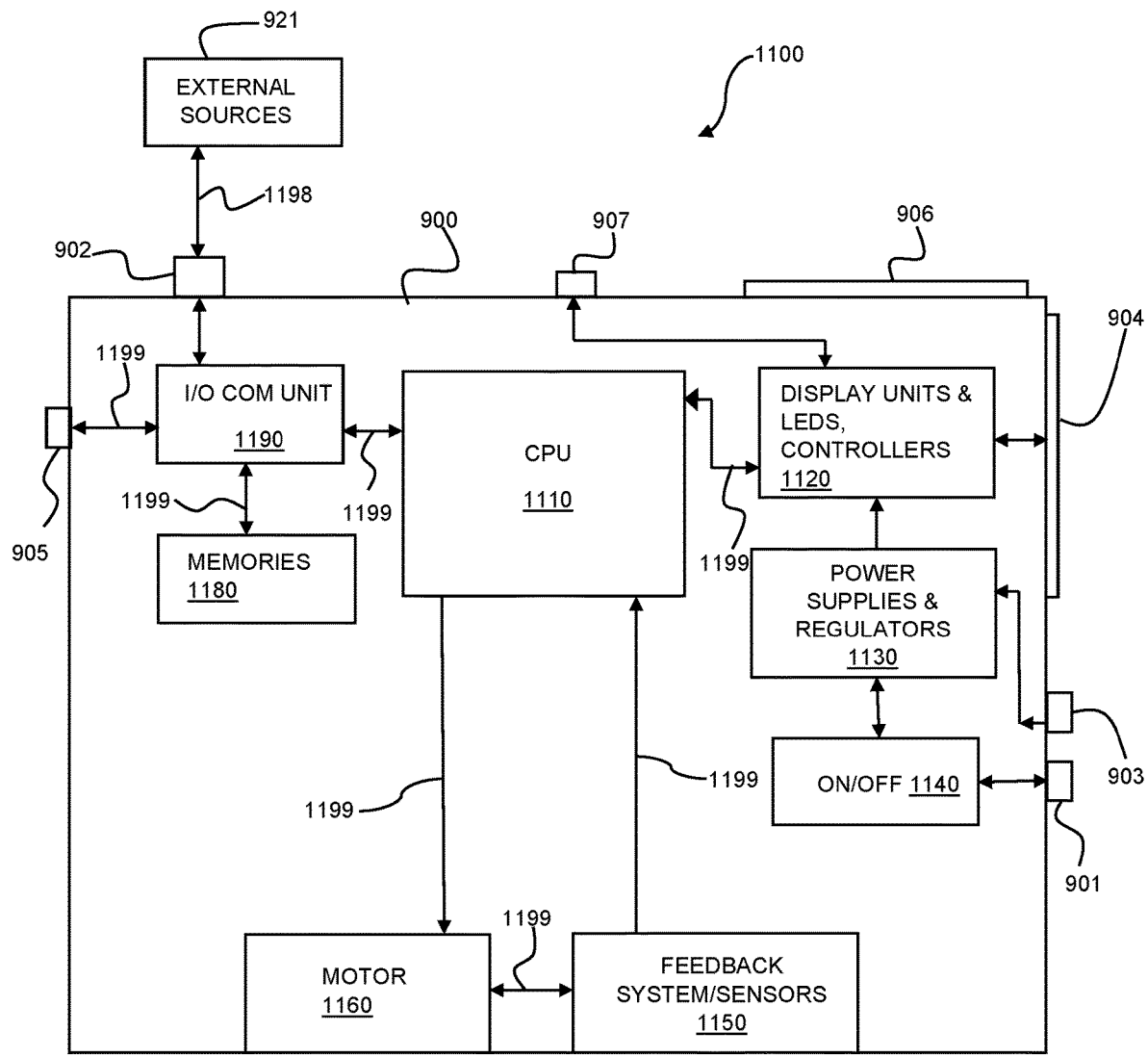
FIG. 11 is schematic diagram of the electronic components of the controller unit of the lab sample grinder in accordance with an exemplary embodiment of the present invention.

Now referring to FIG. 11, a schematic diagram 1100 representing an electrical system and controls of controller unit 900 in accordance with an exemplary embodiment of the present invention is illustrated. Controller unit 900 includes a central processing unit (CPU) 1110, display timing, light, & emitting diodes (LEDs) controllers 1120, a power supply 1130, an ON/OFF switch 1140, a feedback system 1150, a motor 1160, memory devices 1180, and an input/output communication unit 1190, all connected together by electrical connectors 1199.

In various embodiments of the present invention, a push ON/OFF button 901 is used to turn on or turn off lab sample grinder 100. An ON/OFF control unit 1140, connected to ON/OFF button, is an electrical switch that either connects or disconnects power supplies and voltage regulators 1130 with other components in controller unit 900. Electrical connector 903 uses either electrical power from a wall outlet (not shown) or batteries. In some other embodiments, electrical connector 903 is a typical male-female IEC 320 connectors. In some other embodiments, electrical connector 903 is male DC power jack plugs of various sizes from 0.6 mm to 2.1 mm. Yet in some embodiments, electrical connector 903 is a Universal Serial Bus (USB).

Continuing with FIG. 11, CPU 1110 controls every operating aspects of display timing, light, & emitting diodes (LEDs) controllers 1120, a power supply 1130, an ON/OFF switch 1140, a feedback system 1150, a motor 1160, memory devices 1180, and an input/output communication unit 1190. CPU 1110 is also programmed to communicate with external sources 921 such as smart phones, laptops, desktop computers, personal digital assistance (PDA), and tablets via a communication channel 1198. Past and present data and instructions received from external sources 921 are stored in memories 1180. These data and instructions include time setting and velocity settings, warnings, status, etc. Time and velocity settings can also be accomplished manually via time setting button 905 and velocity setting button 902 respectively. Angular velocity display in rpm is observed through digital display 906. The remained time is observed at display unit 904. It will be appreciated that communication channel 1198 may include, but not limited to, short range wireless communication channels, mid-range wireless communication channels, and long range wireless communication channels. Wireless short range communication channels include ZigBee™/IEEE 802.15.4, Bluetooth™, Z-wave, NFC, Wi-fi/802.11, cellular (e.g., GSM, GPRS, WCDMA, HSPA, and LTE, etc.), IEEE 802.15.4, IEEE 802.22, ISA100a, wireless USB, and Infrared (IR), etc., Medium range wireless communication channels in this embodiment of communication link include Wi-fi and Hotspot. Long range wireless communication channels include UHF/VHF radio frequencies.

Continuing with FIG. 11, feedback system and sensors 1150 receive operating information from the above-listed components and inform CPU 1110. In many embodiments of the present invention, sensors including temperature, vibration, weight overloading, and voltage or current overloading are used. In a non-limiting examples of the operations of feedback system and sensors 1150 include: when controller unit 900 is overheated, CPU 1110 turns on the warning LED 907. As such, users may stop the grinding/milling/homogenizing operations. Motor 1160 is a speed varying rotor or any type of motor that can vary the angular velocity so that different samples 715 can be grind, milled, or homogenized, depending on each application.

It will be appreciated that electrical connectors 1199 may be electrical wires etched on a printed circuit board (PCB) where central processing unit (CPU) 1110, display timing, light, & emitting diodes (LEDs) controllers 1120, power supply 1130, ON/OFF switch 1140, feedback system 1150, a motor 1160, memory devices 1180, and input/output communication unit 1190 are mounted.

Figure 12:
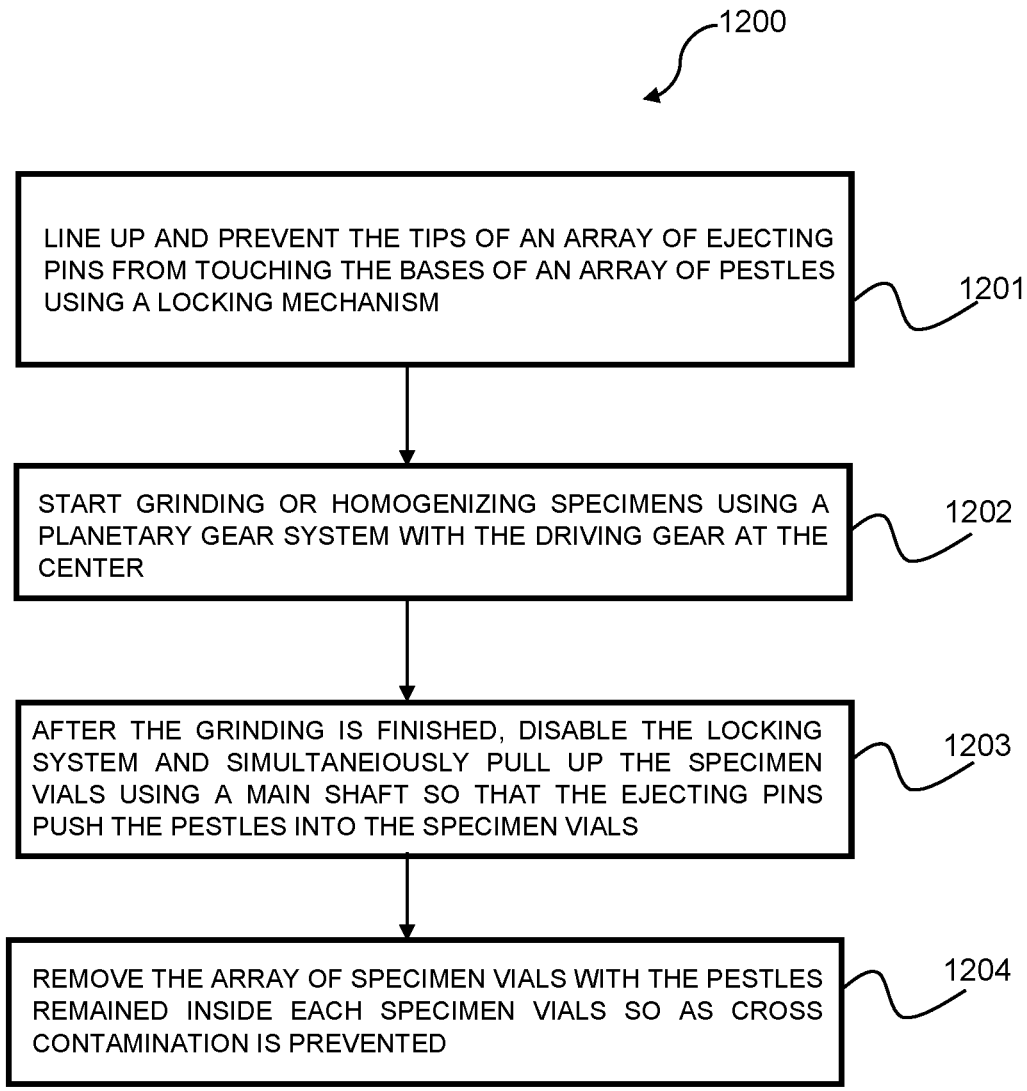
FIG. 12 is a flowchart of a method of grinding multiple lab specimens without cross-contamination using only one electrical motor in accordance with an exemplary embodiment of the present invention.

Finally, referring to FIG. 12, a method 1200 of grinding/milling/homogenizing a laboratory sample to achieve efficiency and without cross-contamination in accordance with an exemplary embodiment of the present invention is illustrated. In many aspects of the present invention, method 1200 is performed with lab sample grinder 100 described above. Any devices or apparatuses that employ the steps described below is also within the scope of method 100 of the present invention.

At step 1201, laboratory samples contained in an array of mortars are lined up with an array of pestles ejecting pins using a locking mechanism. Step 1201 is realized by alignment lock key 403, alignment lock receiver 501, array of pestle ejecting pins 311, array of Eppendorf tubes 710 inserted in first insertion disc 410 and second insertion disc 420, which is performed by motion A.

Next, at step 1202, the multiple lab samples are milled, homogenized, or ground simultaneously using a planetary gear system. In many aspects of the present invention, step 1202 is realized by planetary gear system 1000 as described in FIG. 10 and motor 207 with controller unit 900 as described in FIG. 11.

At step 1203, after the operation, array of pestles is forced to remain inside array of mortars using the array of pestle ejecting pins. Step 1203 is realized by pulling main shaft 202 all the way up until the tips of array of pestles 311 pushed against the bases of array of pestles 810 until the array of pestles are disconnected from mounting sleeves 430 and fallen into array of mortars 711.

Finally at step 1204, after the operation, laboratory samples are removed with pestles remained inside mortars so that cross contamination between samples. After high speed operations including grinding, milling, homogenizing, etc., if the array of pestles 810 are remained connected to planetary gear system 1000 and mounting sleeves 430, the deaccelerating velocity of motor 207 can definitely causes droplets or debris of samples to spray into adjacent and other mortars, causing contamination. In many aspects of the present invention, step 1204 is realized by pulling up main shaft 202 as described by motion B until array of ejecting pins 311 meet and push array of pestles 810 to fall into array of mortars 711. Next, motions C and D are performed to remove array of mortars 711 from second housing unit 400.

Figure 13:
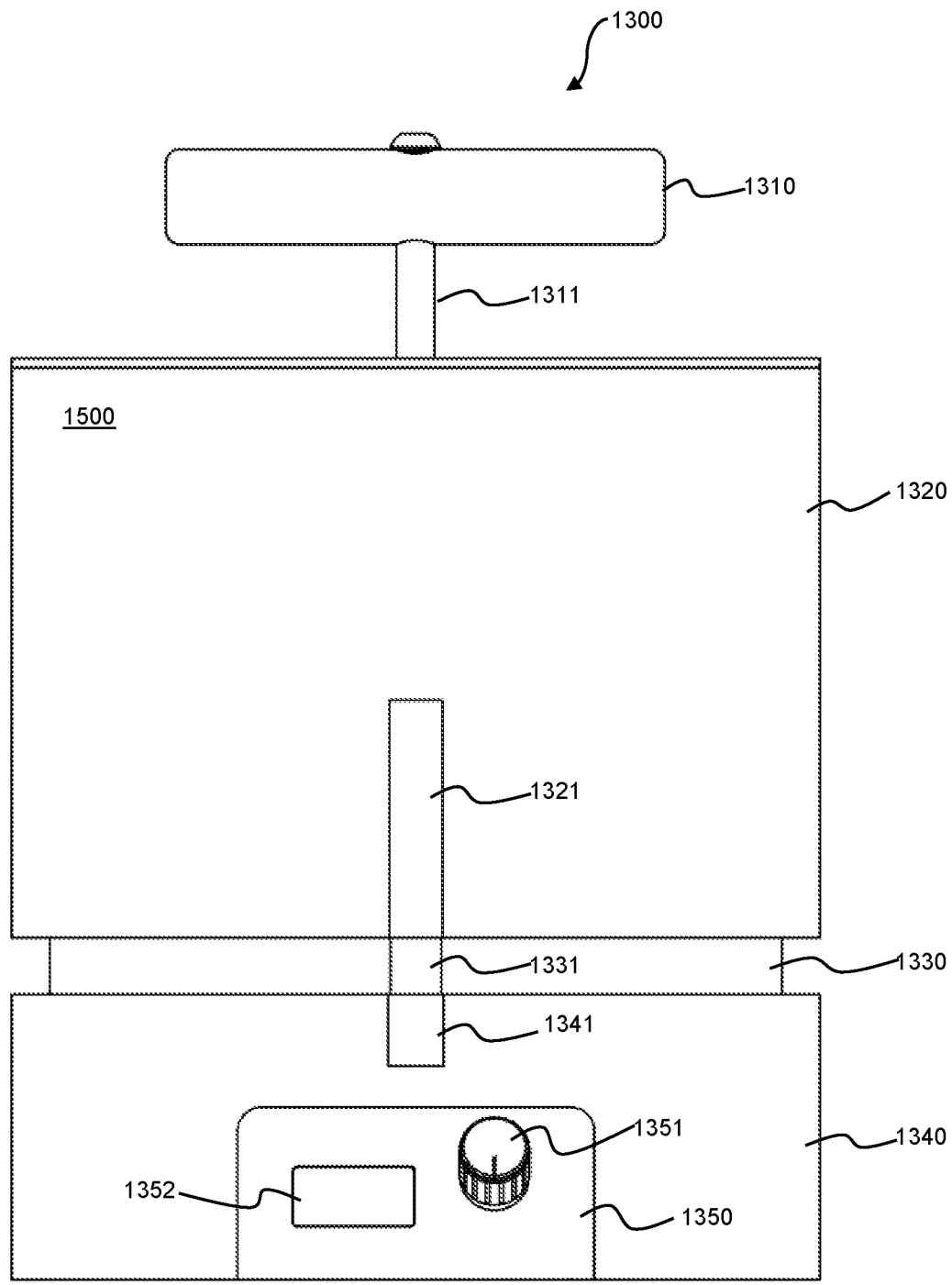
FIG. 13 is a 3D diagram illustrating a front surface of a lab sample grinder in accordance with another exemplary embodiment of the present invention.
Figure 14:
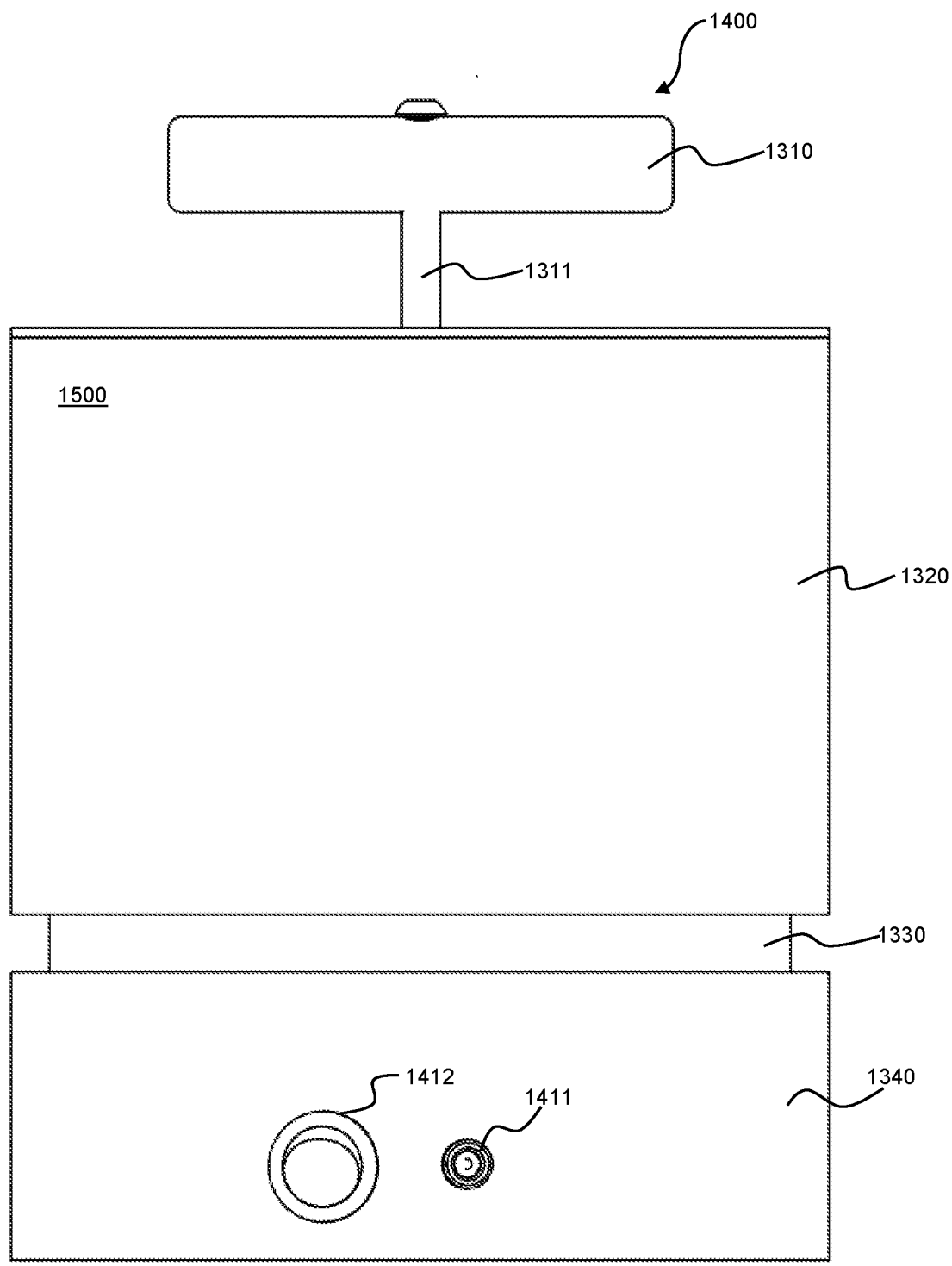
FIG. 14 is a 3D diagram illustrating a back surface of the lab sample grinder in accordance with another exemplary embodiment of the present invention.

Now FIG. 13-FIG. 30 disclose another embodiment of the present invention. Referring now to FIG. 13-FIG. 14, a perspective diagrams showing a front side 1300 and a back side 1400 of another lab sample grinder 1500 in accordance with an exemplary embodiment of the present invention is illustrated. Lab sample grinder 1500 includes a handle 1310 connected to an axle 1311, a top housing unit 1320, a base unit 1330, and controller housing unit 1340. Unlike lab sample grinder 100, handle 1310 is rotated in one direction to firmly lock pestles firmly before grinding. After finish, handle 1310 is rotated in the opposite direction to eject pestles into the Eppendorf tubes. First housing unit 1320 includes a first alignment marker 1321 designed to align with a second alignment marker 1331 of base unit 1330 which, in turn, is aligned with a third alignment marker 1341. First alignment marker 1321, second alignment marker 1331, and third alignment marker 1341 are designed to align the internal components of units 1320-1340; thus, lab sample grinder 1500 is easy to assemble. Needless to say, if not lined up properly, lab sample grinder 1500 does not operate properly. Samples will be spilled out causing contamination. Parts and pestles will be damaged. In many embodiments of the present invention, first alignment marker 1321, second alignment marker 1331, and third alignment marker 1341 are made in form of rectangular dimples carved into respective housing units 1320-1340. Controller housing unit 1350 also includes an electrical control panel 1350. Control panel 1350 further includes a rotary knob 1351 and a display screen 1352. FIG. 14 shows that controller housing unit 1340 also includes a power supply jack 1411 and an ON/OFF power switch 1412. Power supply jack 1411 is DC coaxial jack socket 12 VDC/5 A. To change the operation speed, rotary know 1351 is rotated clockwise or counterclockwise. To change the operation time (0-99 minutes), rotary knob 1351 is pressed in and rotated clockwise or counterclockwise. Pressing rotary know 1351 in changes the setting of lab sample grinder 1500.

Figure 15:
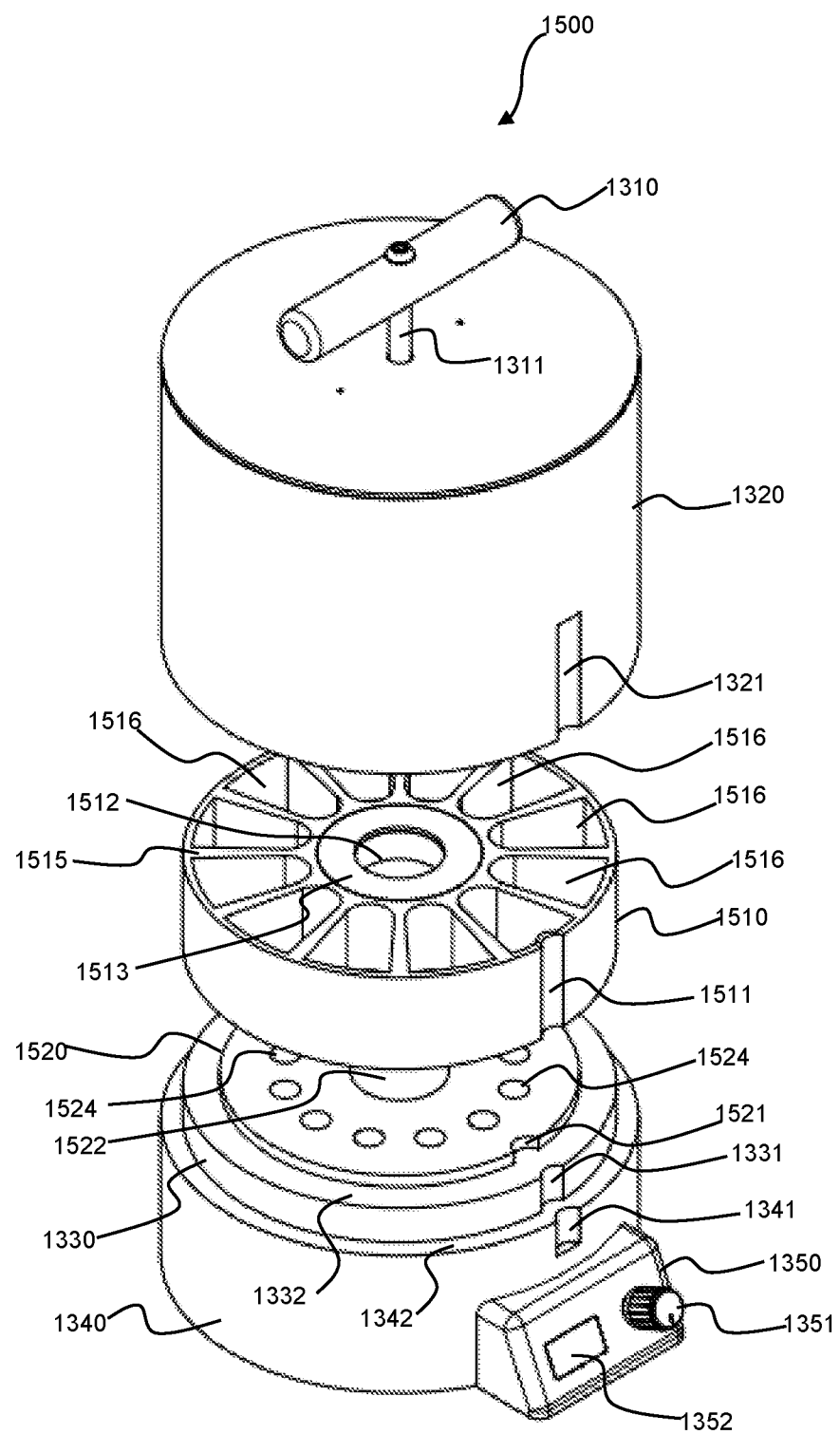
FIG. 15 a 3D diagram illustrating three different housing units of the lab sample grinder in accordance with another exemplary embodiment of the present invention.
Figure 16:
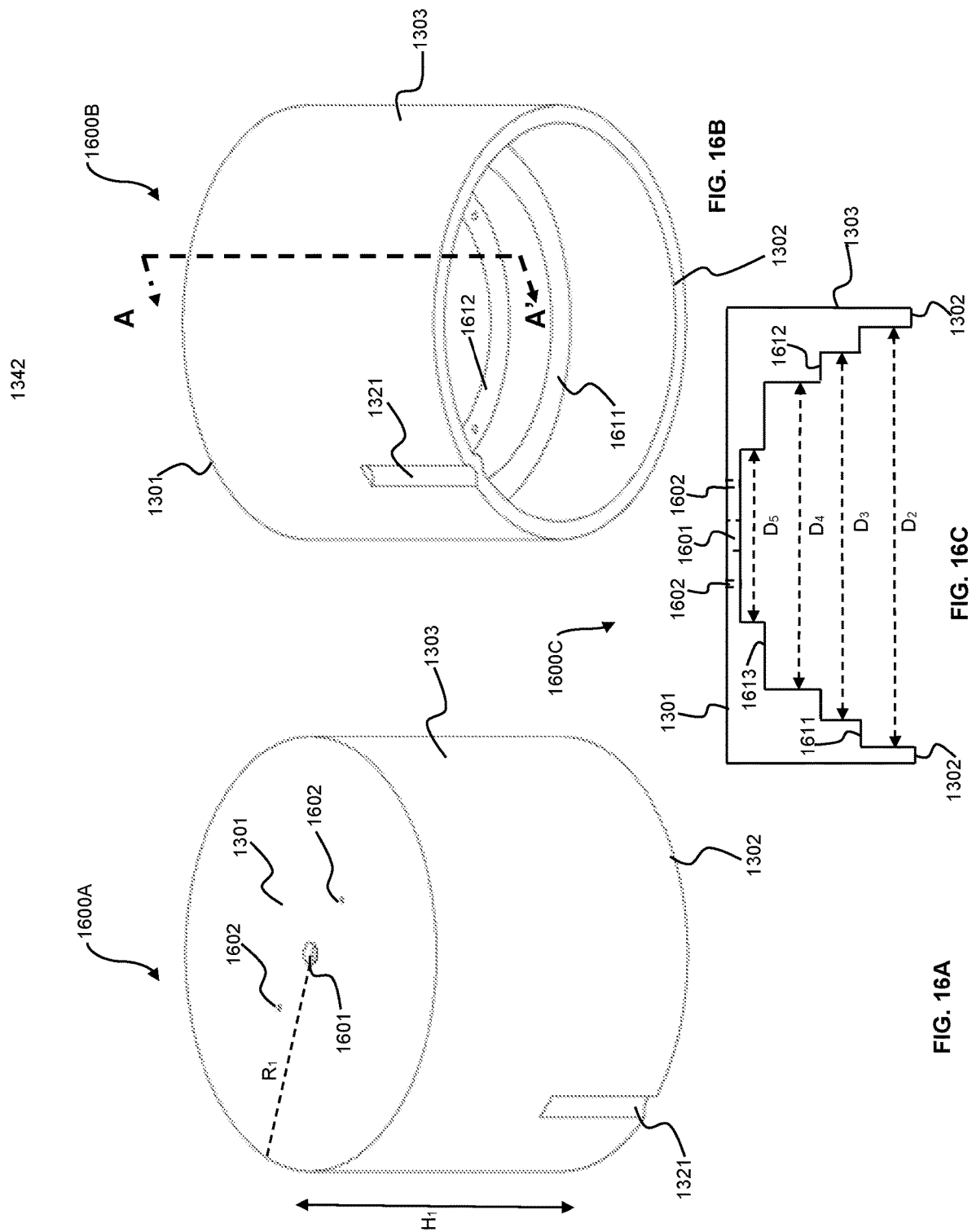
FIG. 16A-FIG. 16C are 3D diagrams illustrating outer and inner structures of the top housing unit respectively in accordance with another exemplary embodiment of the present invention.

Next, referring to FIG. 15, a 3D perspective diagram of lab sample grinder 1500 in accordance with an exemplary embodiment of the present invention is illustrated. Lab sample grinder 1500 has cylindrical shape and made of durable plastic. Inside top housing unit 1320, a tube receptacle unit 1510 is placed concentric with other units 1320, 1330, and 1340. Tube receptacle unit 1510 is where the Eppendorf tubes or the likes are inserted and the grinding/homogenizing takes place. Tube receptacle unit 1510 has a receptacle central opening 1512 and a central rim 1513 where a plurality of dividing walls 1515 radially originating from. Plurality of dividing walls 1515 radiates from receptacle central opening 1512 at a constant distance to form compartments 1514 where Eppendorf tubes (not shown) or the likes are inserted. This arrangement of tube receptacle unit 1510 looks like a half cut orange or a jewelry divider box. Compartments 1514—separated by dividing walls 1515—serve to prevent cross-contamination from occurring during operation. On the lateral side of tube receptacle unit 1510, a receptacle alignment marker 1511 is formed to line up with other markers 1321, 1331, and 1341. Controller housing unit 1340 includes base unit 1330 and a tube insertion unit 1520. Base unit 1330 has a larger radius than and supports tube receptacle unit 1510. Base unit 1330 has the same radius as that and is lined flush rim-to-rim with top housing unit 1320. Tube insertion unit 1520 has a smaller radius than and built concentric with the other two units 1510 and 1330. As a result, a top rim border 1332 is formed between tube insertion unit 1520 and base unit 1330; and a bottom rim border 1342 is formed between controller housing unit 1340. With respect to tube insertion unit 1520, tube receptacle unit 1510 has larger radius and placed concentric with so that it contains tube insertion unit 1520 completely inside. Tube insertion unit 1520 has a tube alignment marker 1521 that is lined up with receptacle alignment marker 1511 and second alignment marker 1331 and third alignment marker 1341. In assembly, all markers 1321, 1511, 1521, and 1341 must line up as shown. On the top surface of tube insertion unit 1520, a tube central hole 1522 is located at the center lined up with receptacle central opening 1512. A plurality of lower tube insertion holes 1524 is formed in a circular pattern around tube central hole 1522.

Next referring to FIG. 16A-FIG. 16B, an exterior diagram 1600A and interior diagram 1600B of top housing unit 1320 in accordance with exemplary embodiments of the present invention are illustrated. FIG. 16A shows an exterior structure 1600A of top housing unit 1320. Top housing unit 1320 has a hollow cylindrical shape with a height $H_1$ and radius $R_1$. Top housing unit 1320 has a top side 1301, bottom side 1302 and a lateral side 1303. First alignment marker 1321 is a rectangular dimple formed on lateral side 1303 and extending to the edge of bottom side 1302. At the center of this cylindrical shape is a through hole 1601 designed for piston 1311 to be inserted there through. A pair of venting holes 1602 is formed on top side 1301. In FIG. 16B shows an interior 1600B of top housing unit 1320. Interior 1600B is designed to have a first edge level 1611, a second edge level 1612, and a third edge level (see FIG. 16C). The purpose of first edge level 1611, second edge level 1612, and third edge level 1613 will be disclosed later. FIG. 16C is a cross-section diagram 1600C of top housing unit 1320 viewed from a cut AA'. From cross-section diagram 1600C, first edge level 1611 is formed close to bottom 1602. Second edge level 1612 is formed above first edge level 1611. Third edge level 1613 is formed closest to top side 1301. In many embodiments, the inner diameter of top housing unit 1320 is $D_2$. The inner diameter of first edge level 1611 is $D_3$, that of second edge level 1612 is $D_4$, and of third edge level 1613 is $D_5$. Within the present disclosure, $D_1 > D_2 > D_3 > D_4 > D_5$.

Figure 17:
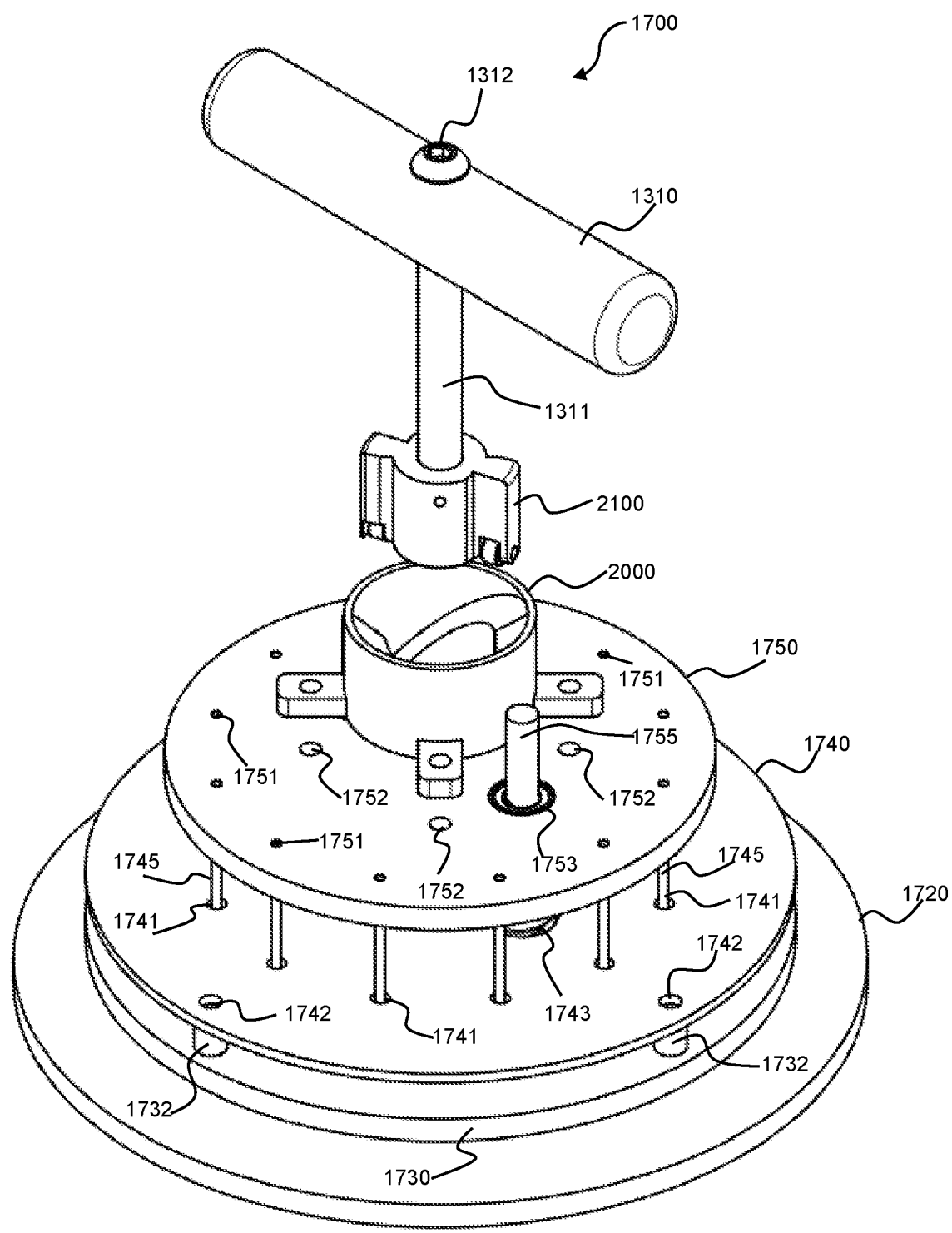
FIG. 17 is a 3D diagrams illustrating inner components of the top housing unit respectively in accordance with another exemplary embodiment of the present invention.

Next referring to FIG. 17, a 3D diagram showing the interior components 1700 of lab sample grinder 1500 in accordance with an exemplary embodiment of the present invention is illustrated. Handle 1310 is connected to one end of axle 1311 by a threaded screw 1312. The other end of axle 1311 is connected to a roller connector 2100.

Roller connector 2100 is inserted into a ramp pressing connector 2000. Both ramp pressing connector 2000 and roller connector 2100 will be disclosed later in FIG. 20 and FIG. 21 respectively. The following boards are included to mate with first edge level 1611, second edge level 1612, and third edge level 1613. From the bottom of top housing unit 1320, a first board 1720 has a circular shape with a diameter equal to $D_2$. Next, a second board 1730 also has a circular shape with a diameter $D_3$. Second board 1730 is affixed directly onto first board 1720 which directly touches first edge level 1611. A third board 1740 also has circular shape with a diameter $D_3$. Third board 1740 is arranged to directly touch and screwed fixed to second edge level 1612. See FIG. 19. A fourth board 1750 is also circular with diameter smaller than $D_4$ and contained completely inside the space formed above third edge level 1613. Fourth board 1750 includes top pestle ejection holes 1751, ramp connector holes 1752, and bearing holes 1753. Top pestle ejection holes 1751 are arranged around the perimeter of fourth board 1750 for connecting pestle ejection pins 1745. There are twelve pestle ejection pins, each for one compartment 1514. Spacers 1732 connect at spacer holes 1742 for maintaining a constant distance between second board 1730 and third board 1740. In addition, bearing poles 1755 are spaced to directly touch the above third edge level 1613. Bearing poles 1755 are used to fix all boards 1720, 1730, 1740, and 1750 to top housing unit 1320 via bearing holes 1743.

Figure 18:
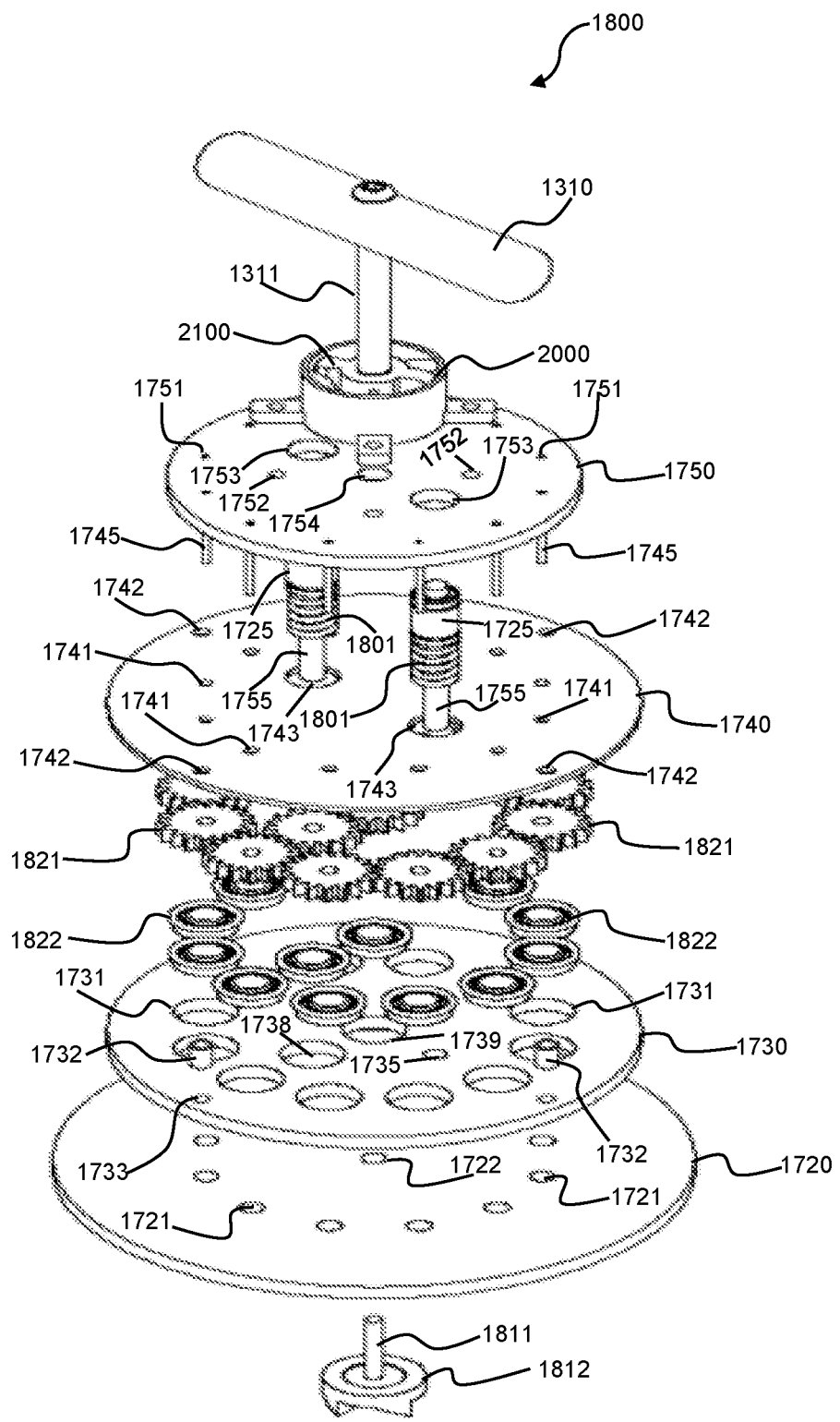
FIG. 18 is 3D diagrams illustrating detailed components of the top housing unit in accordance with another exemplary embodiment of the present invention.

Now referring to FIG. 18, a 3D perspective diagram 1800 showing the remaining components inside top housing unit in accordance with an exemplary embodiment of the present invention is illustrated. A plurality of pestle insertion holes 1721 is formed around the perimeter of first board 1720. At the center of first board 1720, a shaft hole 1722 is drilled so that a rotor coupler 1811 can go through there. Rotor coupler 1811 is connector to a rotor (not shown) in controller housing unit 1340. A plurality of gear container holes 1731 is formed around the perimeter of second board 1730. End bearing holes 1735 where bearing poles 1755 are secured are also formed on second board 1730. Gear container holes 1731 align with plurality of pestle insertion holes 1721. A driver gear container hole 1739 is located at the center of second board 1730. An idler gear container 1738 is located between gear container holes 1731 and driver gear container hole 1739. Idler gear container hole 1738 and driver gear container hole 1739 do not connected to any pestles (not shown). Lower spacer holes 1733 are aligned with upper spacer holes 1742 so that spacers 1732 connects second board 1730 and third board 1740 together. Each bearing pole 1755 is wrapped by a spring 1801 in the space between third board 1740 and fourth board 1750. In the space between second board 1730 and third board 1740, a plurality of gear containers 1822 is inserted in gear container holes 1731. A gear system 1821 is supported by a plurality of gear container 1822.

Figure 19:
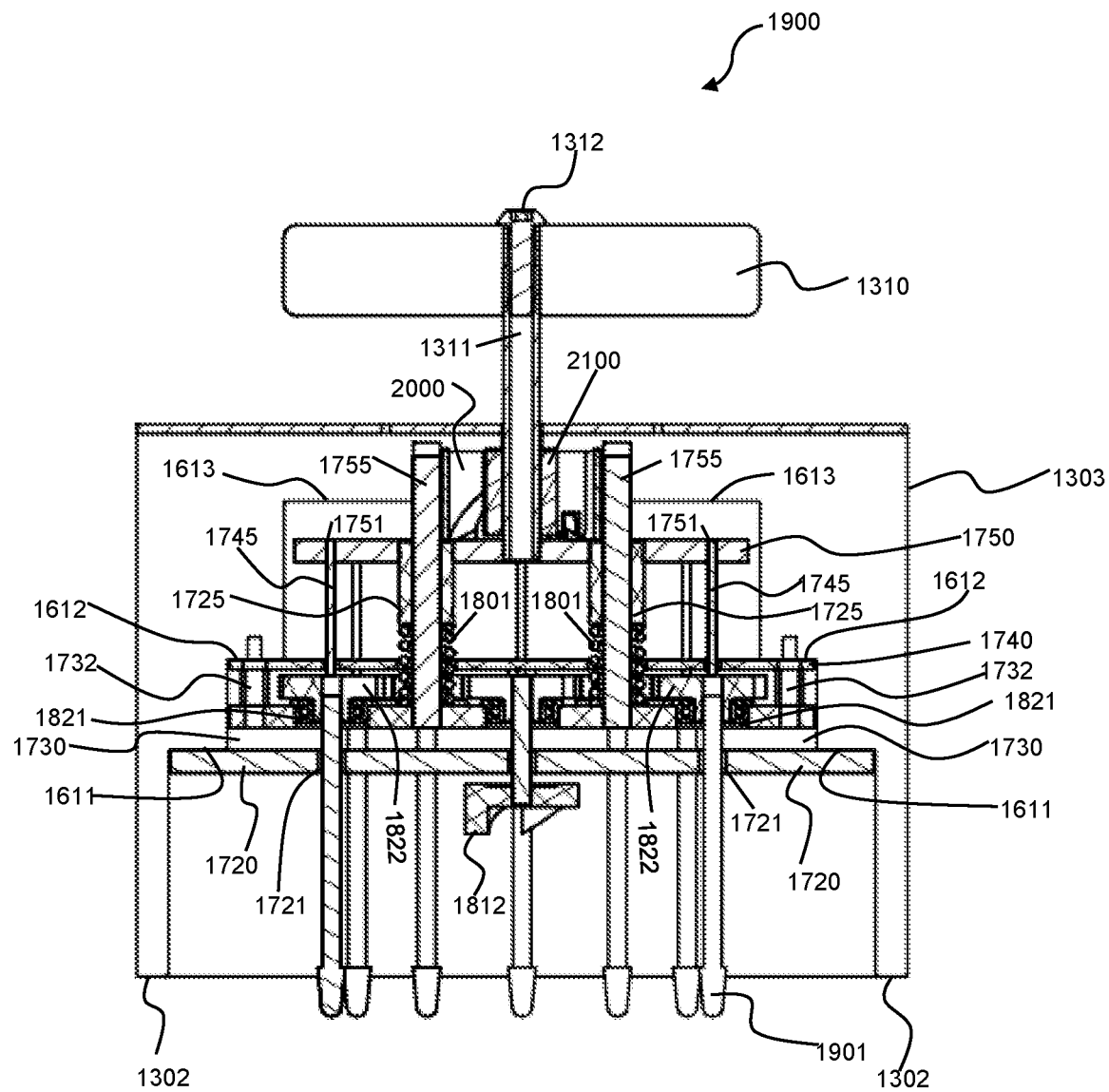
FIG. 19 is 2D diagrams illustrating the arrangement of the components and structure of the top housing unit in accordance with another exemplary embodiment of the present invention.

Next referring to FIG. 19, a 2D cross-section diagram 1900 showing all the interior components and their relative position inside top housing unit in accordance with an exemplary embodiment of the present invention is illustrated. From the bottom side 1302 of top housing unit 1320, first board 1720 and second board 1730 are dimensioned so that they are directly touched interior diameter $D_2$ and the walls of first edge level 1611 respectively. A plurality of pestles 1901 are inserted via pestle insertion holes 1721 through first board 1720, second board 1730, plurality of gear containers 1722, idler gear container hole 1738, driver gear container hole 1739, gear container holes 1731, gears 1821, and bottom pestle injection holes 1741. Second board 1730 is connected to third board 1740 and firmly secured to second edge 1612. Ramp pressing connector 2000 is sandwiched between bearing poles 1755 that are spaced apart to directly touch the walls of third edge level 1613. Pestle injection pins 1745 emerge from pestle injection holes 1751 and reach down to third board 1740 through upper pestle injection holes 1741. On the other pestles 1901 are inserted via pestle insertion holes 1721 and gear container holes 1731 through first board 1720 and second board 1730. In operation, before use, pestles 1901 are inserted from the bottom side 1302 through bottom pestle insertion holes 1721. As shown, top housing unit 1320 is laid on top of controller housing unit 1340 by which alignment markers 1321, 1332, and 1341 are lined up. That way, motor coupler 1311 is coupled to a rotor (not shown). After use, handle 1312 is turned, compressing spring 1801 that causes pestle injection pins 1735 to push pestles 1901 to fall into Eppendorf tubes or the likes (not shown). Thus, cross-contamination caused by manually taking out pestles 1901 of Eppendorf tubes can be avoided. When handle 1312 is released, spring 1801 causes pestle injection pins 1735 return to their original positions.

Figure 20:
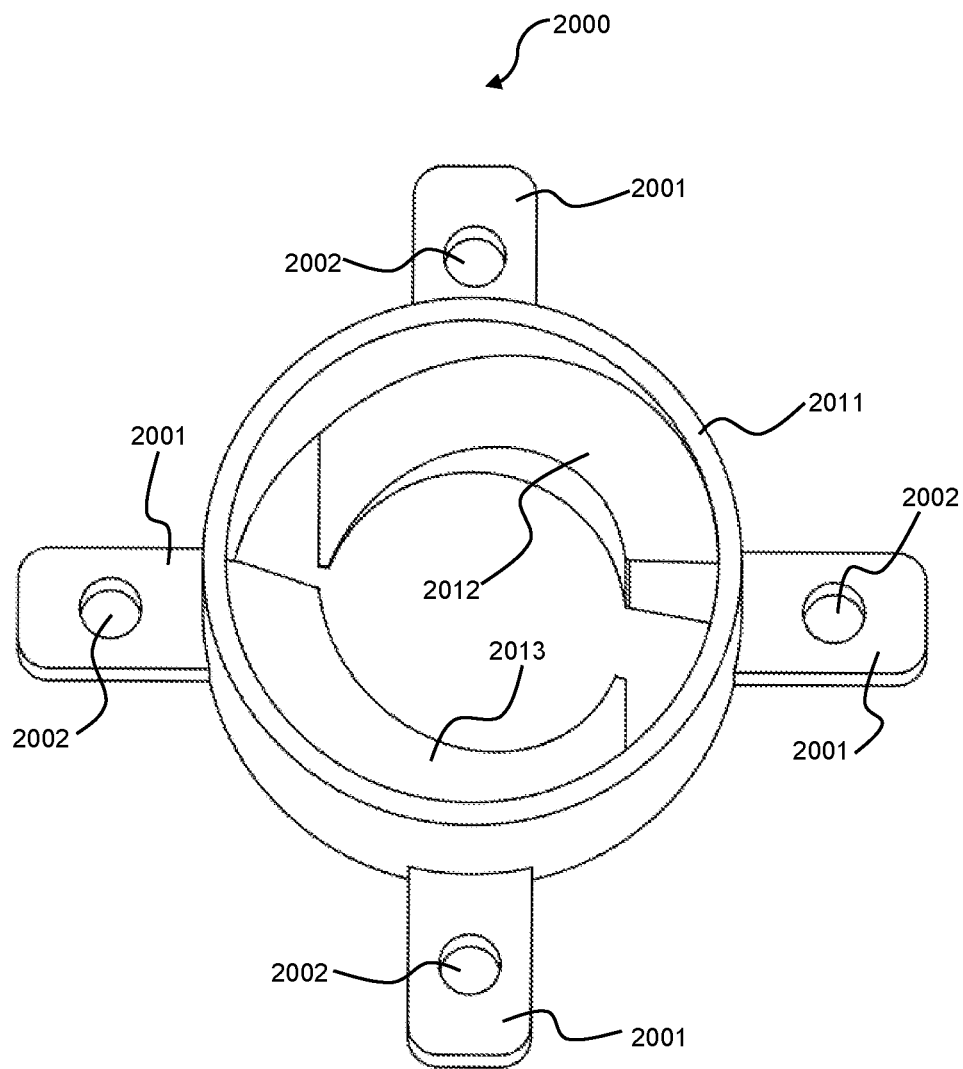
FIG. 20 is 3D diagrams illustrating the pot connector in accordance with another exemplary embodiment of the present invention.

Next referring to FIG. 20, a 3D perspective diagram of a ramp pressing connector 2000 in accordance with an exemplary embodiment of the present invention is illustrated. Ramp pressing connector 2000 includes a hollow circular housing 2011. In the inner perimeter, a pair of curved ramps 1912 and 1913 is formed. On the outer perimeter, four connector legs 2001 at 90° degree angle to one another are formed. Each connector leg 2001 has a hole 2002 that aligns with ramp connector holes 1752 so that ramp pressing connector 2000 is fastened onto fourth board 1750.

Figure 21:
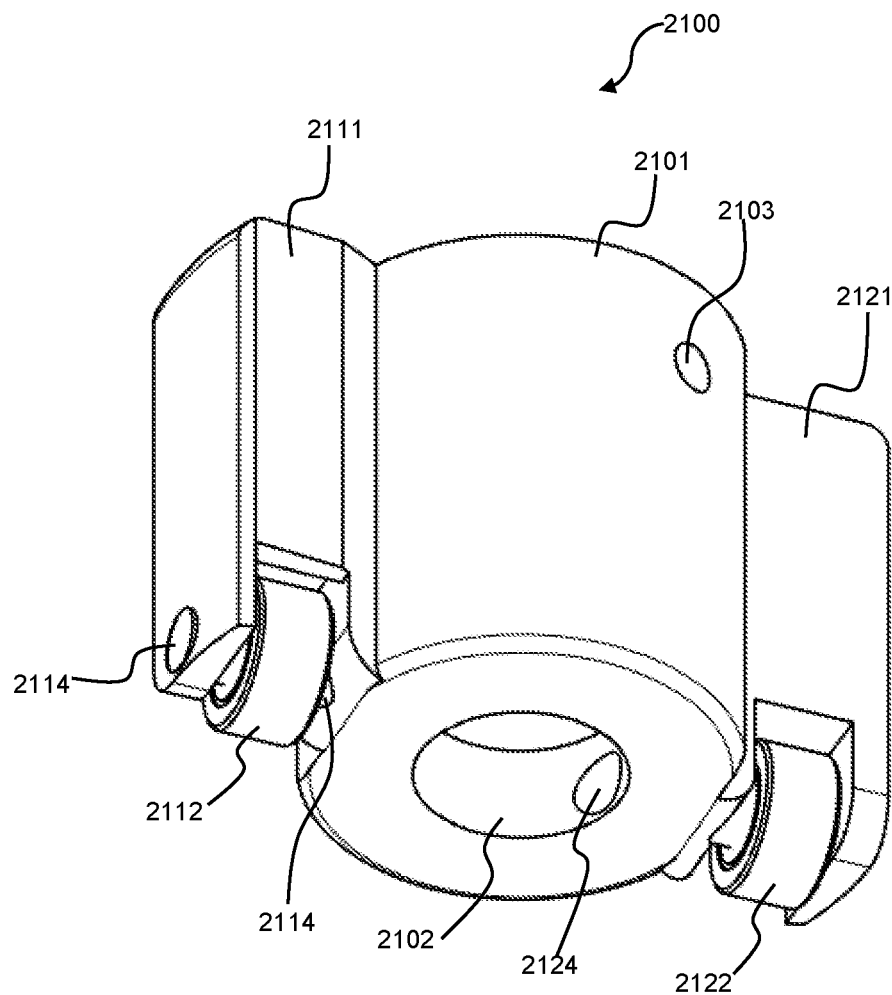
FIG. 21 is 3D diagrams illustrating the roll connector in accordance with another exemplary embodiment of the present invention.

Next referring to FIG. 21, a 3D perspective diagram of a roller connector 2100 in accordance with an exemplary embodiment of the present invention is illustrated. Roller connector 2100 has a main hollow cylindrical body 2101 with a hollow interior 2102. On one side of cylindrical body 2101, a first wheel housing unit 2111 stores a first wheel 2112 by a first axle 2114. On the opposite side, a second wheel housing unit 2121 stores a second wheel 2122. First wheel 2112 is connected to first wheel housing unit 2111 by a first axel 2114. Second wheel 2122 is connected to second wheel housing unit 2121 by a second axle 2124. A pair of ball lock or pin lock 2103 securely fastens roller connector 2100 to axle 1311. The other end of axle 1311 is connected to handle 1310 by threaded screw 1312. Roller connector 2100 is placed inside ramp pressing connector 2000. As handle 1310 is turned, first wheel 2112 and second wheel 2122 would roll down pair of curved ramps 1912-1913. This would compress spring 1801, lowering fourth board 1750 which causes plurality of ejection pins 1735 to push down pestles 1901.

Figure 22:
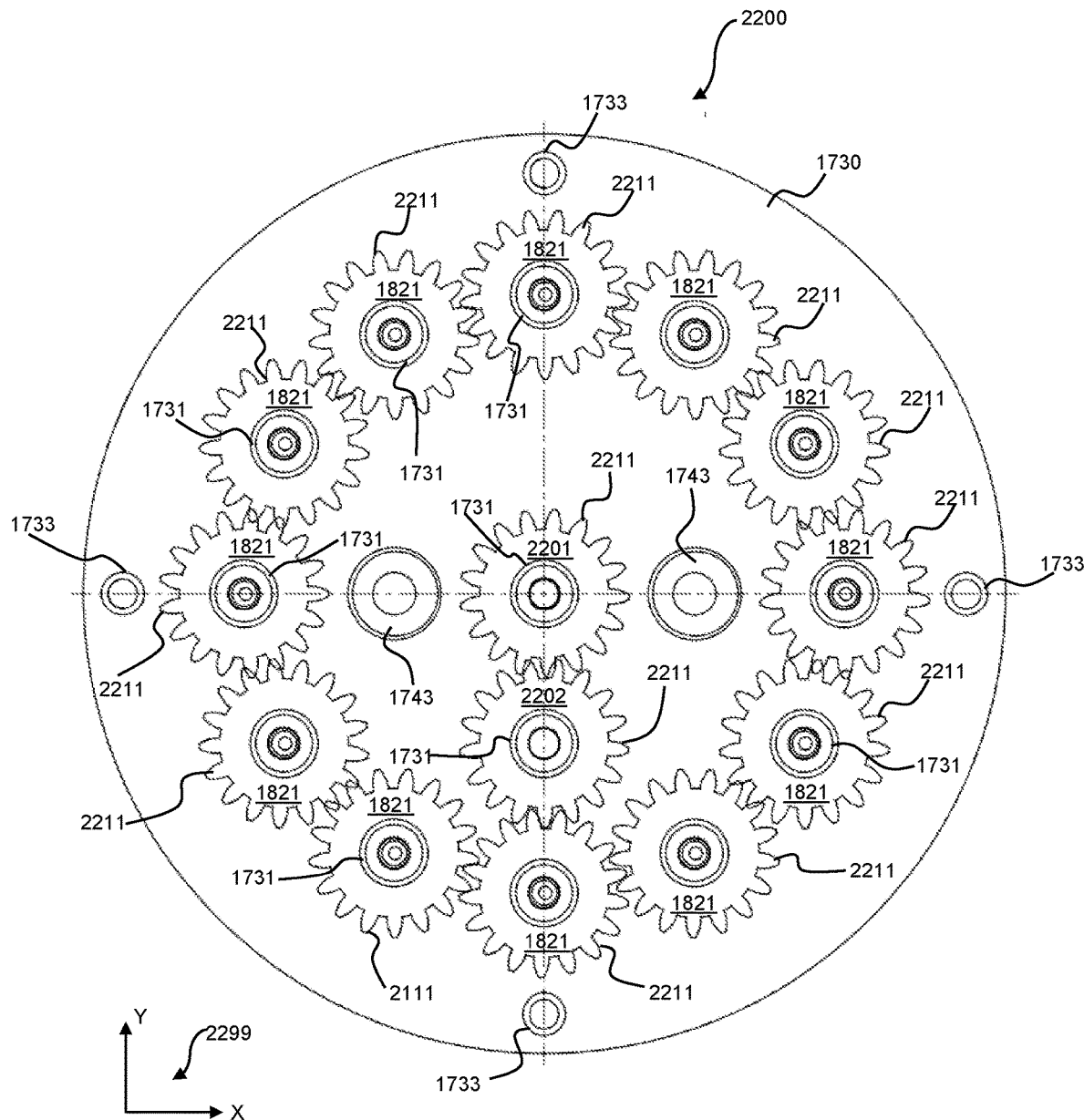
FIG. 22 is 2D diagrams illustrating gear system in accordance with another exemplary embodiment of the present invention.

Referring to FIG. 22, a 2D top view of a gear system 2200 in accordance with an exemplary embodiment of the present invention is illustrated. As alluded above, gear system 2200 are arrange around the perimeter of second board 1730. Unlike gear system 1000 of FIG. 10, gear system 2200 is arranged in circular pattern with a driver gear 2201 at the center, an idler gear 2202 in the middle, and driven gears 1821 around the perimeter. As shown in FIG. 18, driven gears 1821 are arranged in a circular pattern around the perimeter of second board 1730. All gears 2201, 2202, and 1821 have teeth 2211 with the same pith diameter and tooth profile. Thus, their velocity ratio is the same. Bearing holes 1743 and lower spacer holes 1733 are on the same diameter of second board 1730 of the X-axis. The other two lower spacer holes 1733 lie along the same diameter of second board 1730 along the Y-axis of a Cartesian coordinate system 2299. Driver gear 2201 is placed inside one of driver gear containers 1821 which is placed on driver gear container holes 1739. Idler gear 2202 is placed inside another driver gear containers 1821 which is placed on gear container hole 1738.

At this point, the disclosure of top housing unit 1320 and its components are completely disclosed. Now are the disclosures of tube receptacle unit 1510 and controller housing unit 1340.

Figure 23:
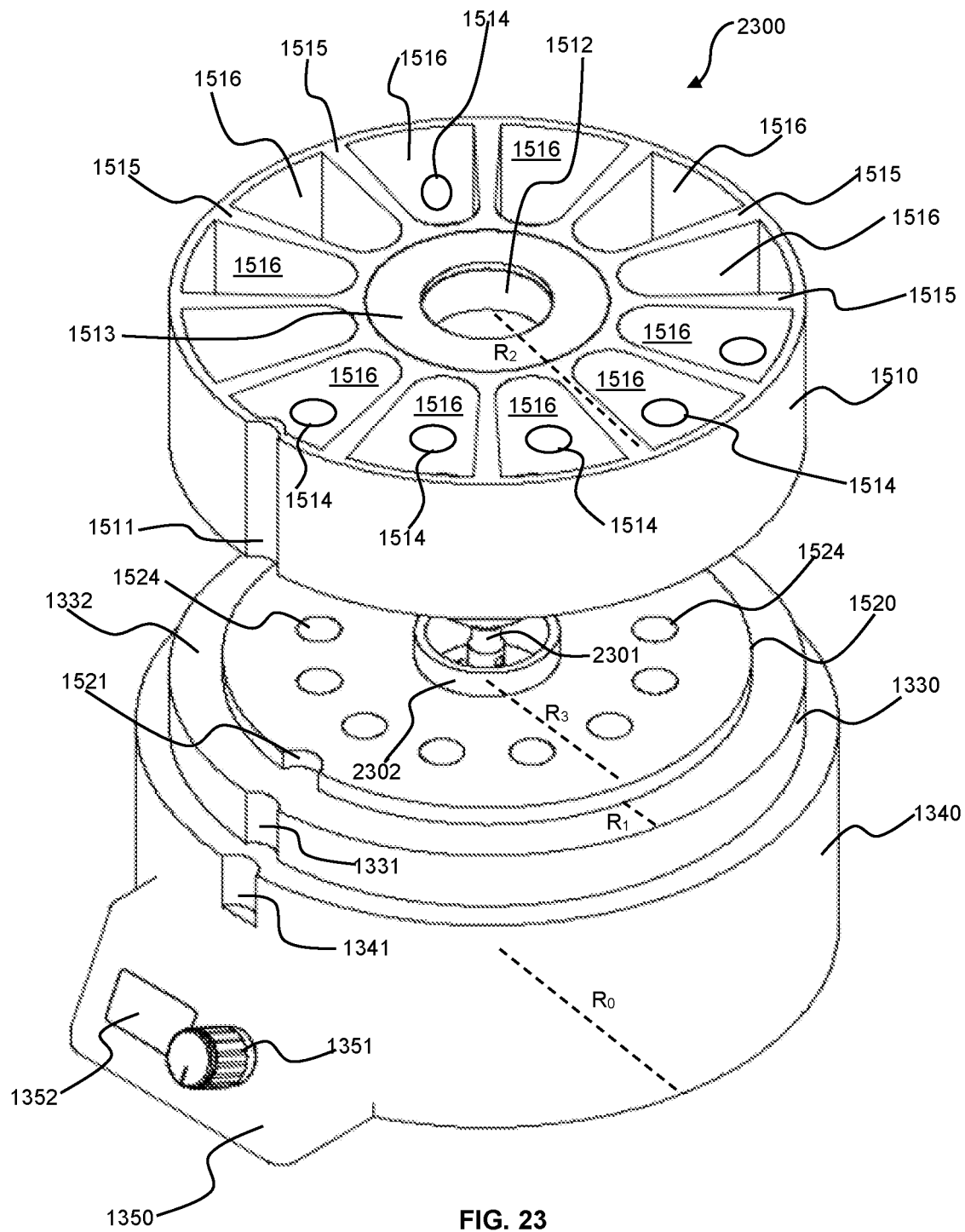
FIG. 23 is 3D diagrams illustrating the grinder unit and the motor unit in accordance with another exemplary embodiment of the present invention.

Referring to FIG. 23, a 3D perspective diagram 2300 illustrating the position of tube receptacle unit and the controller housing unit in accordance with an exemplary embodiment of the present invention is shown. Tube receptacle unit 1510 is separable from controller housing unit 1340 and top housing unit 1320. Tube receptacle unit 1510 has the same radius $R_2$ smaller than the radius $R_1$ of top housing unit 1320. Tube receptacle unit 1320 has the same structure of a half cut orange or a circular jewelry organizer box with a plurality of compartments 1516. Each compartment 1516 is separated by dividing walls 1515. At the bottom of each compartment 1516 is a top tube insertion hole 1514 where each Eppendorf tube 2401 is manually inserted. Dividing walls 1515 are all originating from receptacle central opening 1512 with a receptacle central rim 1513. Controller housing unit 1340 includes a shaft adaptor sleeve 2301 and a protective ring 2302. As alluded above in FIG. 13, controller housing unit 1340 is designed to achieve multiple objectives: (a) supporting the tips of Eppendorf tubes; (b) housing the rotor; (c) housing the electrical controller board; (d) housing the system of springs that support the Eppendorf tubes or the likes. The interior components of controller housing unit 1340 will be disclosed later. Controller housing box 1340 has three different levels with decreasing radii, forming a step rice terrace. The lowest level, controller housing unit 1340, has the largest radius $R_0$; next level—base unit 1330—having the same radius as radius $R_1$ of top housing unit 1320, and the top level—tube insertion unit 1520—having the smallest radius $R_3$. At the center of tube insertion unit 1520 is central opening 1522 (see FIG. 15). Protective ring 2302 is inserted to central opening 1522 to protect shaft adaptor sleeve 2301. Array of lower tube insertion holes 1524 is arranged around the perimeter of tube insertion unit 1520. The tips of Eppendorf tubes go in array of lower tube insertion holes 1524. In assembly for use, tube receptacle unit 1510 is laid on top of controller housing unit 1540 where the outer rim of tube receptacle unit 1510 rest on border 1332.

Figure 24:
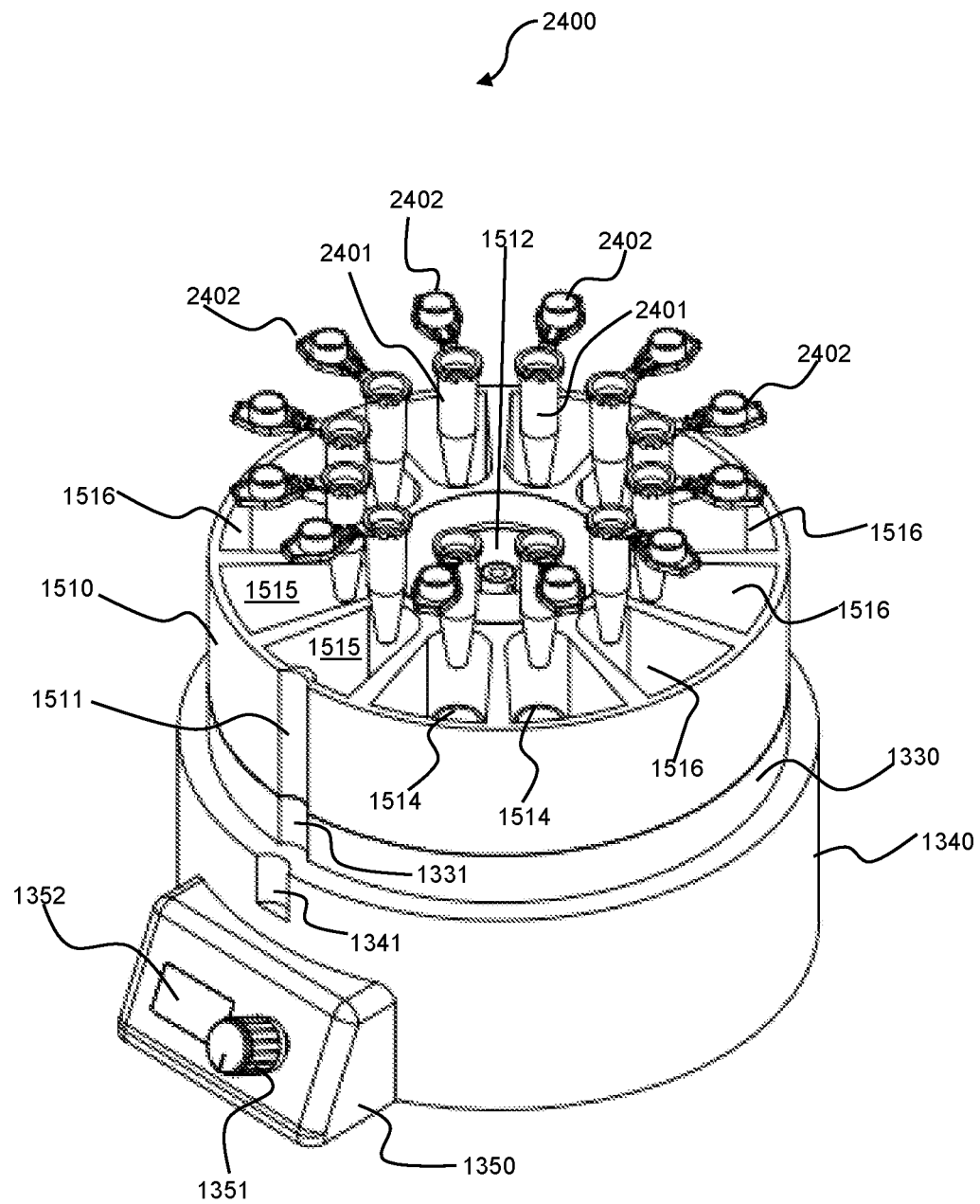
FIG. 24 is 3D diagrams illustrating step the Eppendorf tubes are inserted in the grinder unit which is in turn inserted to the motor unit in accordance with another exemplary embodiment of the present invention.

Next, referring to FIG. 24, a 3D perspective diagram 2400 illustrating the assembly of the tube receptacle unit and the controller housing unit in accordance with an exemplary embodiment of the present invention is shown. After tube receptacle unit 1510 is laid upon controller housing unit 1340 where alignment markers 1511, 1331, and 1341 are lined up, Eppendorf tubes or the likes 2401 ("Eppendorf tubes 2401") are inserted into each compartment 1514 at lower tube insertion holes 1524. Eppendorf tubes 2401 with hinged lid 2402 are 2 mL micro tubes described above in FIG. 7 and well known in the related arts and therefore will not be disclosed in details here.

Figure 25B:
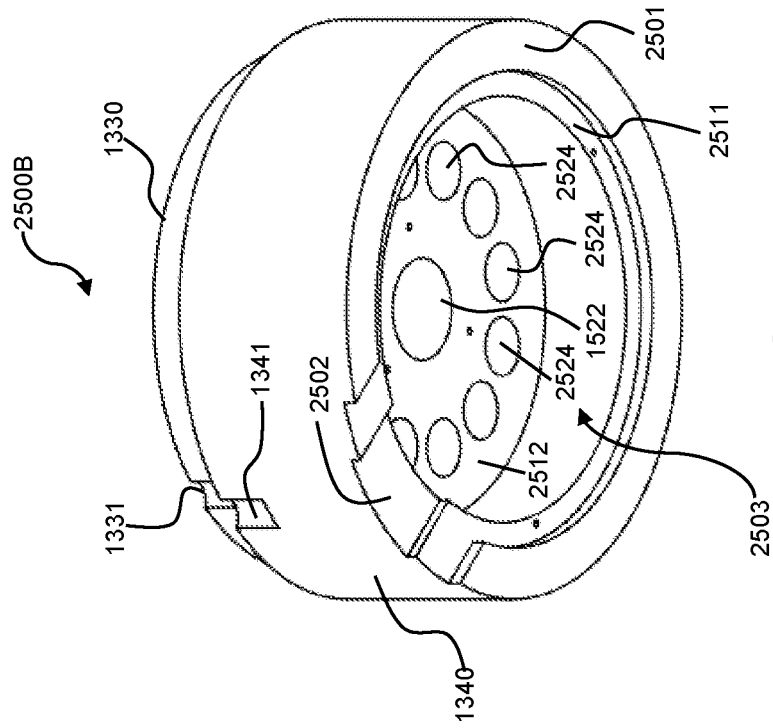
FIG. 25A-FIG. 25B are 3D diagrams illustrating the outer and inner structure of the motor unit in accordance with another exemplary embodiment of the present invention.
Figure 25A:
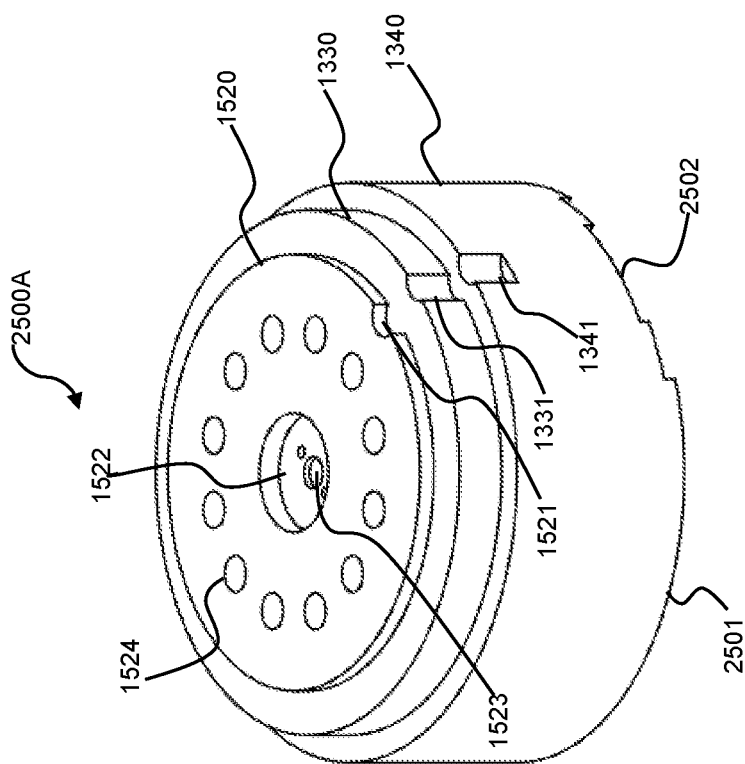

Referring to FIG. 25A-FIG. 25B, 3D perspective diagrams 2500A and 2500B illustrating the outer structure and inner structure of controller housing unit in accordance with an exemplary embodiment of the present invention are shown. In FIG. 25A, beside the structures described in FIG. 15 and FIG. 24 above, controller housing unit 1340 includes a bottom side 2501 with a slit entrance 2502. FIG. 25B shows the interior 2500B of controller housing unit 1340. A hollow space 2503 inside controller housing unit 1340 discloses the bottom side 2501 of array of bottom tube insertion holes 2524. At bottom side 2502, lower tube insertion holes 1524 are opened up to become bottom tube insertion hole 2524 with a larger diameter. Hollow space 2503 also shows that controller housing unit 1340 has bottom side 2501, a first edge level 2511, and a second edge level 2502. Second edge level 2502 is punctuated by central opening 1522 and bottom tube insertion holes 2524.

Figure 26:
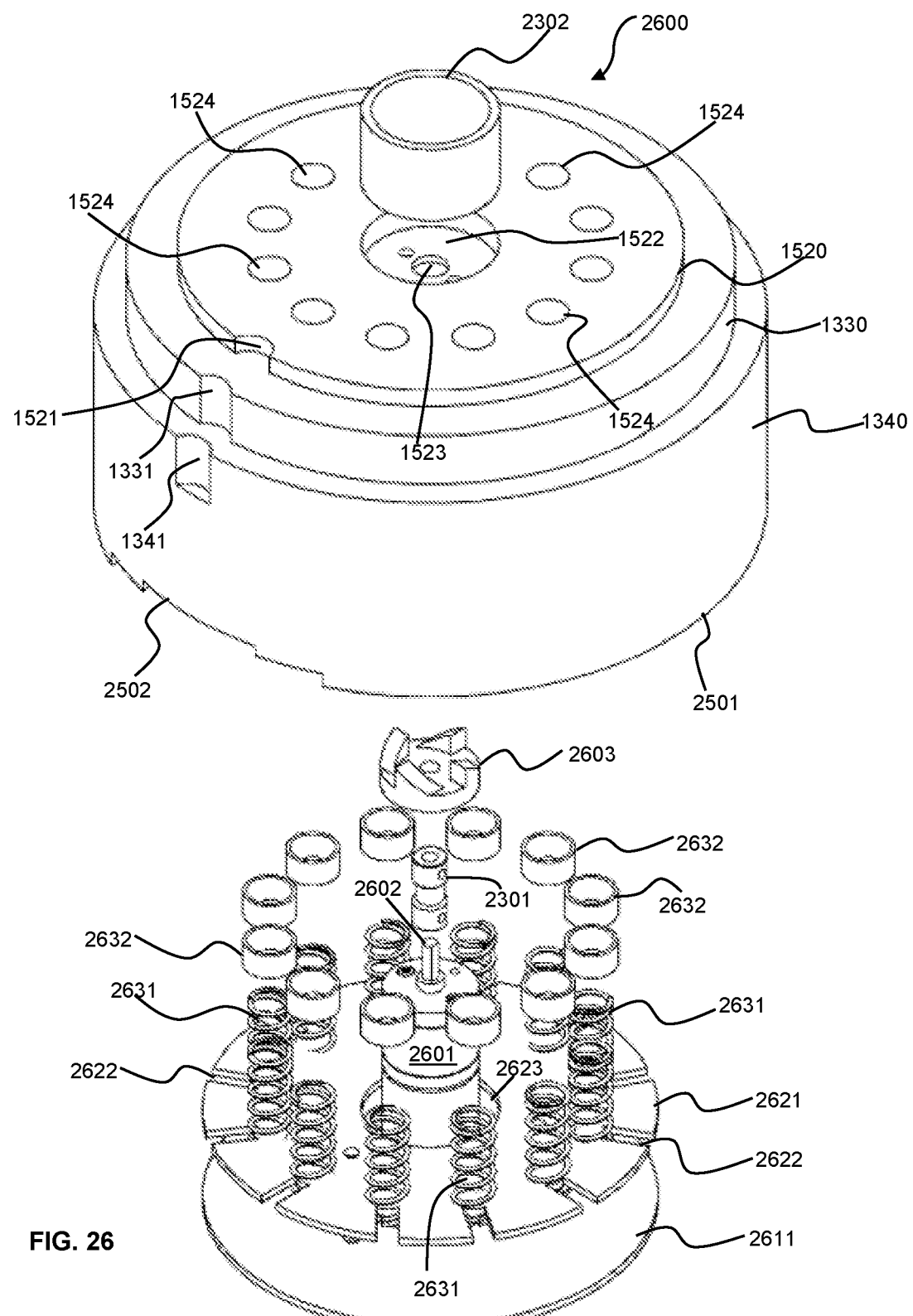
FIG. 26 is a 3D diagram illustrating the inner components of the motor unit in accordance with another exemplary embodiment of the present invention.

Next, FIG. 26 shows interior structures of controller housing unit 1340.

Figure 29:
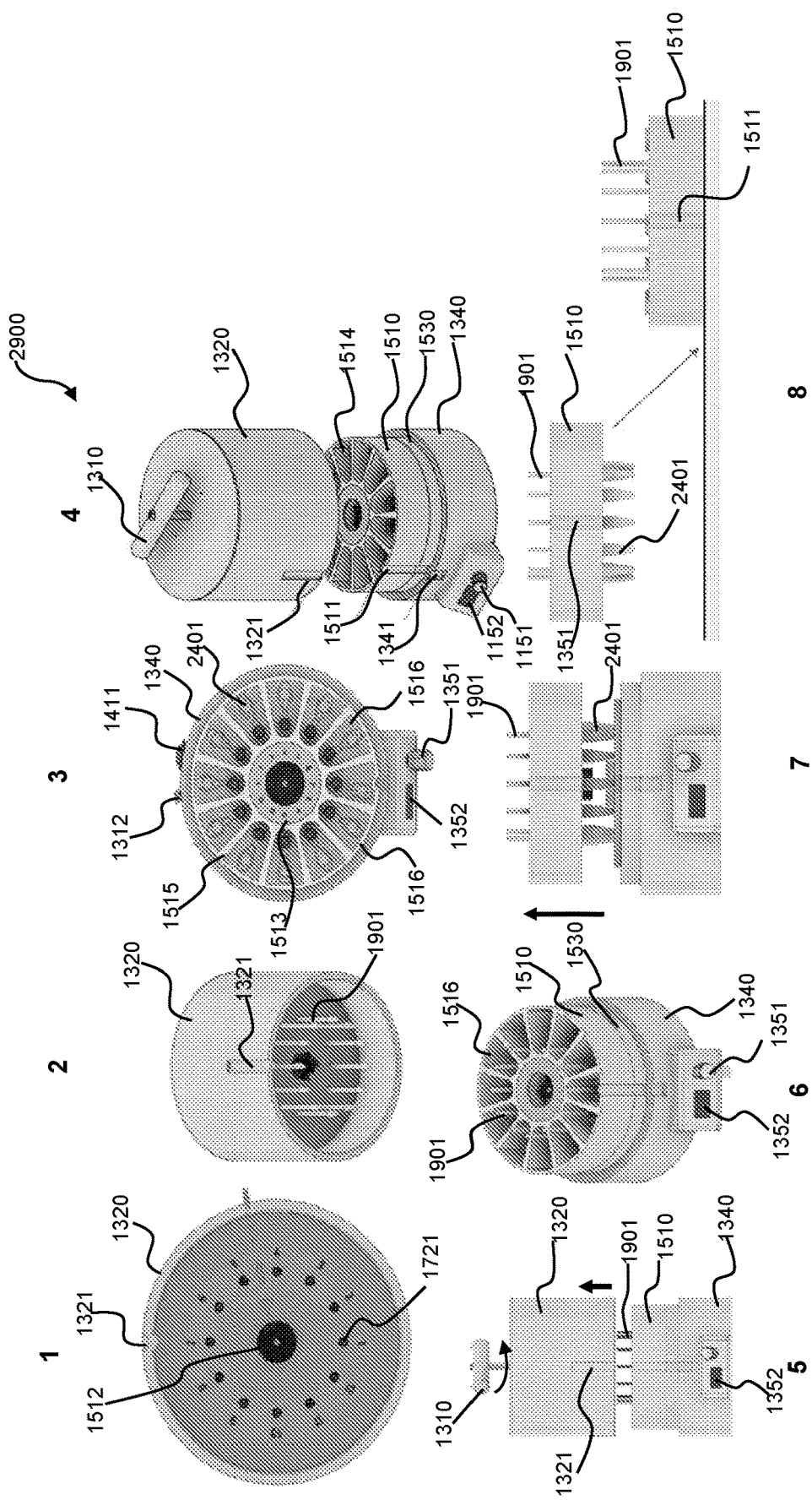
FIG. 29 is a schematic diagram of the controller board of the sample grinder apparatus in accordance with another exemplary embodiment of the present invention.
Figure 30:
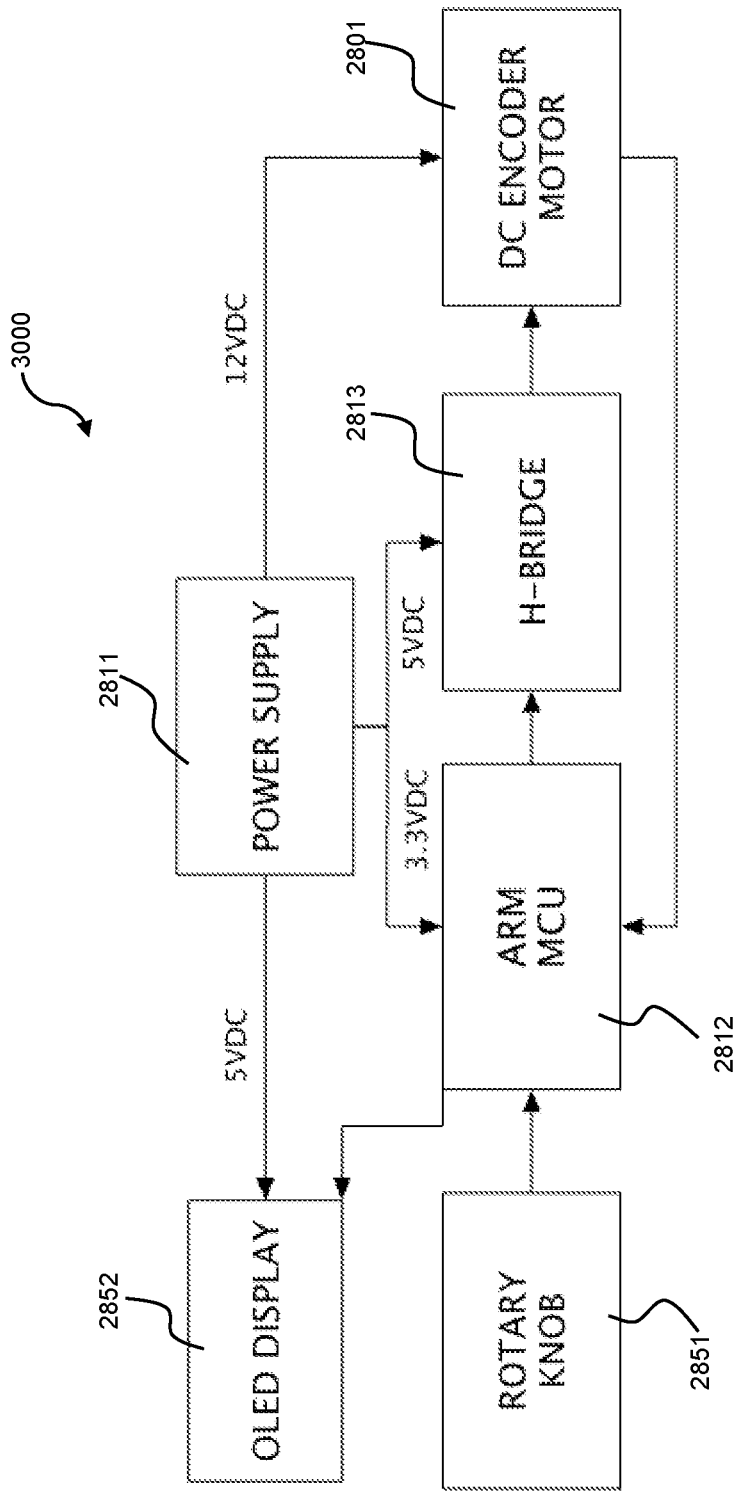
FIG. 30 is a flow chart of a method of grinding/homogenizing laboratory samples in accordance with another exemplary embodiment of the present invention.

From the bottom up, a support board 2611 dedicated to contain controller circuit for a rotor 2601 (see FIG. 30). Next is a spring board 2621 with spring slots 2622 from around the edge. The bottom sides of springs 2631 are inserted and secured into spring slots 2622. The top sides of springs 2631 are fastened to tube containers 2632. At the center of spring board 2621, a rotor opening 2623 is formed so as rotor 2601 is inserted there through. Rotor 2601 is mounted securely onto support board 2611. Support board 2611 may contain a controller circuit board that controls rotor 2601. Rotor 2601 has a drive shaft 2602 which is coupled to shaft adaptor sleeve 2301. Shaft adaptor sleeve 2301 is inserted to a rotor connector 2603. Rotor connector 2603 is mated with rotor coupler 1811 of top housing unit 1320. The following FIG. 27-FIG. 30 clarify the interconnections of the components and structures disclosed so far.

Figure 27:
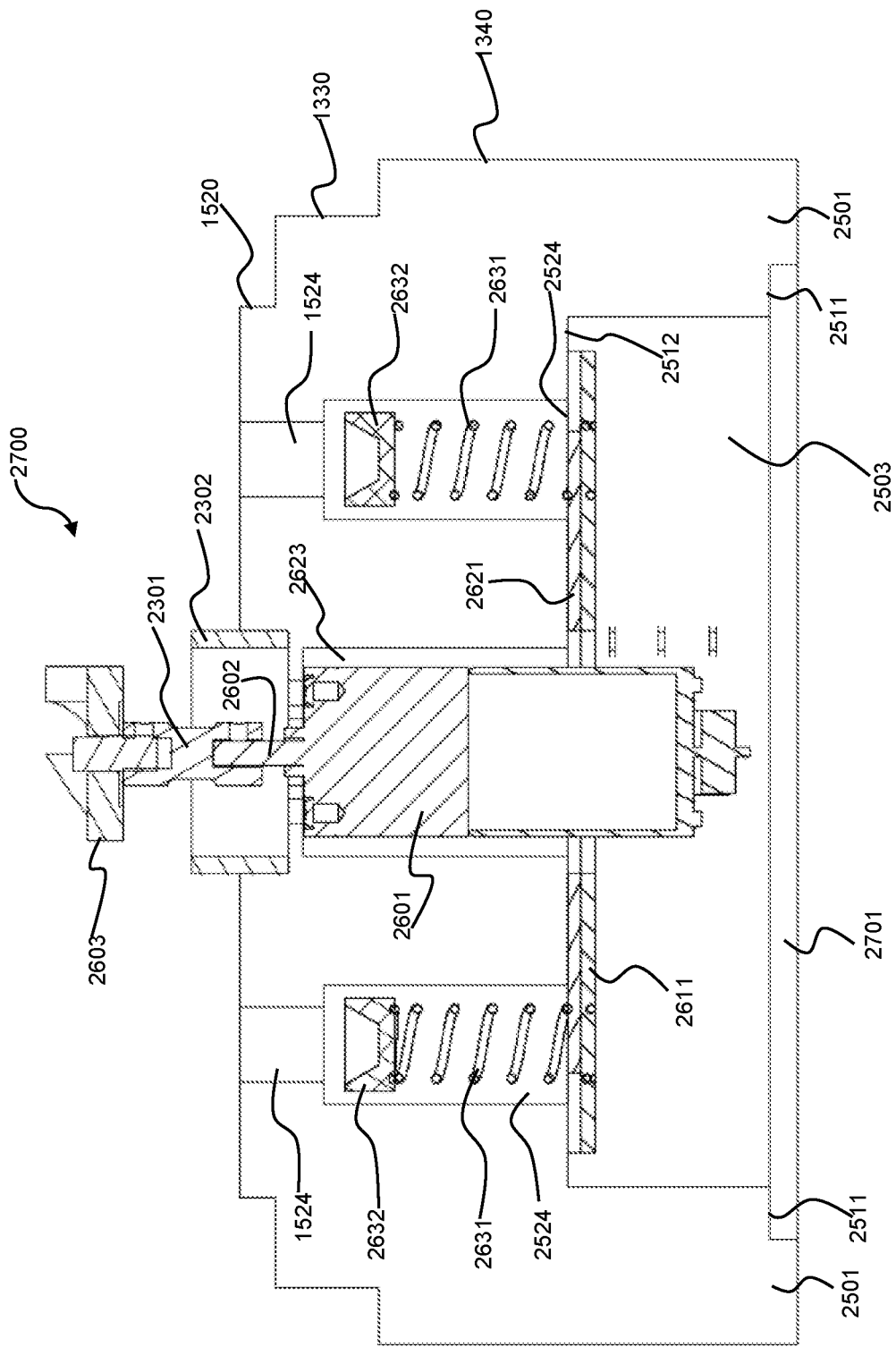
FIG. 27 is a 2D diagram illustrating arrangement of the inner components interior to the motor unit in accordance with another exemplary embodiment of the present invention.

Now referring to FIG. 27, a 2D diagram 2700 depicting the interior structure of the controller housing unit in accordance with an exemplary embodiment of the present invention is illustrated. A base cover lid 2701 is used to close up hollow space 2503. Base cover lid 2701 fits to the distance between first edge 2501 and flushes to bottom rim 2401. Rotor 2601 is inserted through rotor opening 2623. Drive shaft 2602 is connected to shaft adaptor sleeve 2301 which is connected to rotor connector 2603. Spring board 2621 is placed directly on top of support board 2611 and both touching and secured to bottom edge 2502. Springs 2631 are fastened to spring board 2621 inside second lower pin ejection holes 2524. Tube containers 2632 are secured to the top of springs 2631. Springs 2631 are located inside openings 2524 which becomes lower tube insertion holes 1524 where Eppendorf tubes 2401 are inserted.

Figure 28:
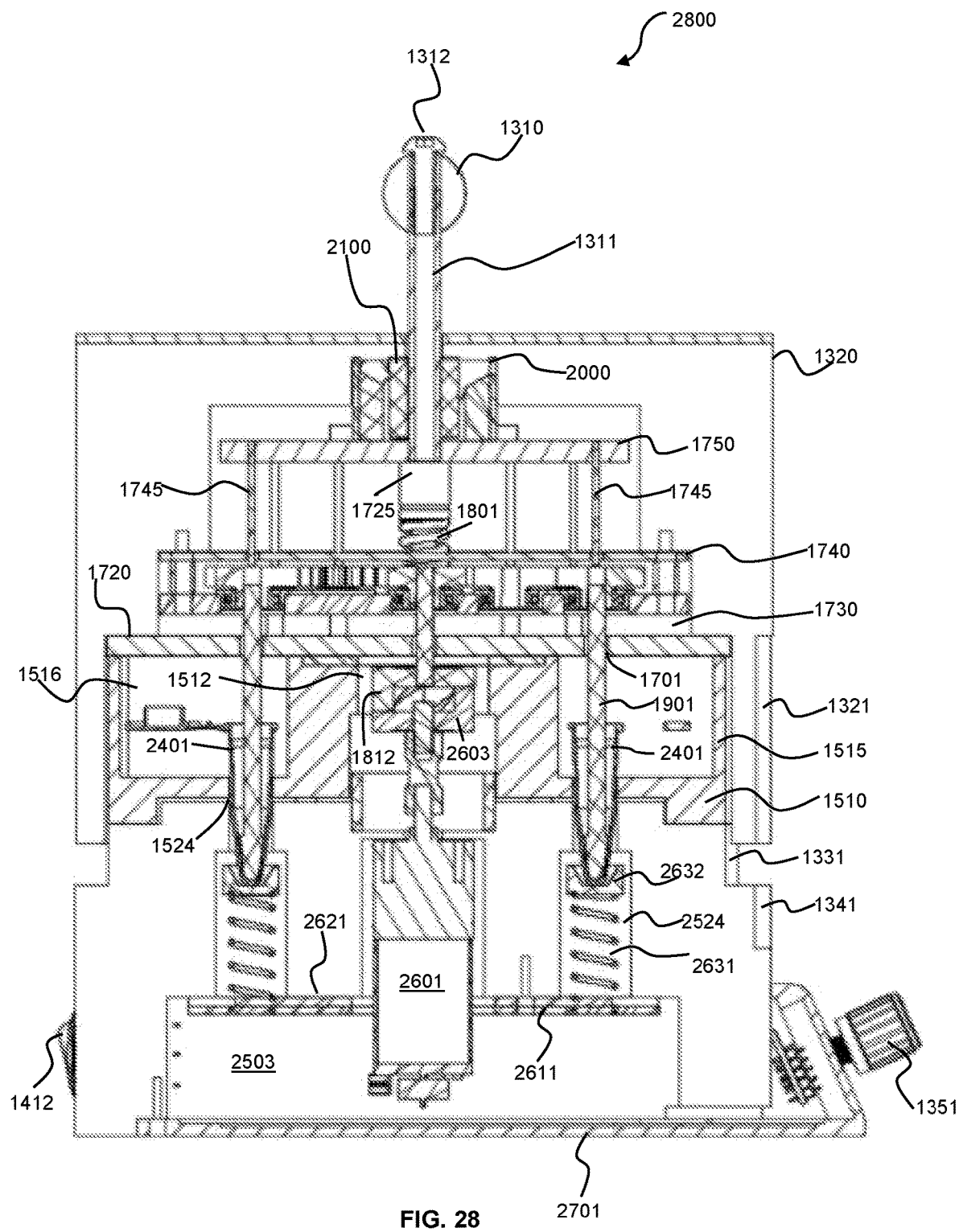
FIG. 28 is a 2D diagram illustrating the assembly of the lab sample grinder apparatus in accordance with another exemplary embodiment of the present invention.

Next, referring to FIG. 28, a 2D perspective diagram 2800 depicting the manner the top housing unit, the Eppendorf receptacle unit, and the controller housing unit are assembled together to form lab sample grinder 1500. The crosshatch portion in the middle is tube receptacle unit 1510 with dividing walls 1515. Eppendorf receptacle unit 1510 is contained completely inside top housing unit 1320. Inside each compartment 1516, pestle 1901 goes through pestle hole 1701 to be inserted inside each Eppendorf tube 2401. With this, and referring back to FIG. 15 and FIG. 27, it can be seen that Eppendorf receptacle unit 1510 loaded with Eppendorf tubes 2401 is laid on top of controller housing unit 1340 and then top housing unit 1320 with pestles 1901 laid on top of tube receptacle unit 1510 where alignment markers 1321, 1331, and 1341 are lined up. When this happens, pestles 1901 are automatically inserted properly inside Eppendorf tubes 2401 and rotor connector 2603 is mated with rotor coupler 1811. At this moment, lab sample grinder 1300 of the present invention is ready to use.

Next, referring to FIG. 29, a diagram 2900 presenting steps of using the lab sample grinder in accordance with exemplary aspect of the present invention is illustrated. Steps 1-4 are for grinding/homogenizing operations. Steps 5-8 are for post-operations. At step 1, first board 1720 of top housing unit 1320 is shown. Plurality of pestle insertion holes 1721, arranged in circular pattern around the perimeter of first board 1720, is numbered from 1 to 12. Pestles 1901 are inserted in each hole 1721 as shown in step 2. Then at step 3, after receptacle unit 1510 is laid on top of controller housing unit 1340, Eppendorf tubes 2401 are inserted in lower tube insertion holes 1524 inside each compartment 1516. In many embodiments of the present invention, receptacle central rim 1513 is also numbered in accordance with plurality of pestle insertion holes 1721. When alignment markers 1321, 1341, and 1511 are lined up, pestle insertion holes 1721 are consequently lined up number by number with lower tube insertion holes 1524. At step 4, top housing unit 1320 loaded with pestles 1901 are laid on top of controller housing unit 1340, which also contains Eppendorf tubes 2401 completely inside and lines up with base unit 1330. After this step lab sample grinder 1300 is ready to use. The speed is set by turning rotary knob 1331. The time of operation can be set by pressing in and turning rotary knob 1331.

Continuing with FIG. 29, steps 5-8 depict the disassembling post-use steps for lab sample grinder 1500. At step 5, handle 1310 is turned to reject pestles 1901 inside Eppendorf tubes 2401. Handle 1310 causes wheels 2112 and 2122 to is roll down rams 1912-1913, causing ejection pins 1735 to eject pestles 1901 into Eppendorf tubes 2401. In step 6, top housing unit 1320 is removed leaving pestles 1901 inside each compartment 1516. Then at step 7, tube receptacle unit 1510 is removed from controller housing unit 1340. Finally, at step 8, tube receptacle 1510 is laid down a surface, causing Eppendorf tubes 2401 are pushed out of lower tube insertion holes 1524. Now samples inside Eppendorf tubes 2401 are ready for further experimenting.

Next, referring to FIG. 30, a schematic diagram of an electrical controller circuit 3000 of the lab sample grinder unit in accordance with an exemplary embodiment of the present invention is illustrated. In various preferred embodiment of the present invention, electrical controller circuit 3000 in form of a PCB circuit board is located at base cover lid 2701 as shown in FIG. 27. Controller circuit 3000 includes a power supply 2811 that can generates a 5 VDC power line, a 12 VDC power line, and a 3.3 VDC by down converting means. A display unit 2852 driven by an advanced RISC machine microcontroller unit (ARM MCU) 2812 to display the operation parameters such as time and speed of lab sample grinder 1500. A rotary know 2851 is electrically coupled to input desired operating parameters to ARM MCU 2812 which uses a 3.3 VDC power supply.

ARM MCU 2812 controls DC encoder motor 2801 by means of an H-bridge 2813 that enables rotor to rotate in either clockwise or counterclockwise direction. H-bridge 2813 uses a 5 VDC voltage supply line and DC encoder motor uses 12 VDC voltage line. DC encoder 2801 also feeds back to ARM MCU 2812. ARM MCU 2812 is a 32-bit microprocessor that enables lab sample grinder 1500 to set both operation time and speed and other parameters. In addition because of ARM MCU 2812, display unit 2852 can display various parameters as well. Yet, in other embodiments of the present invention, ARM MCU 2812 and H-bridge 2813 enable rotor 2601 to rotate in either clockwise or counterclockwise direction.

Figure 31:
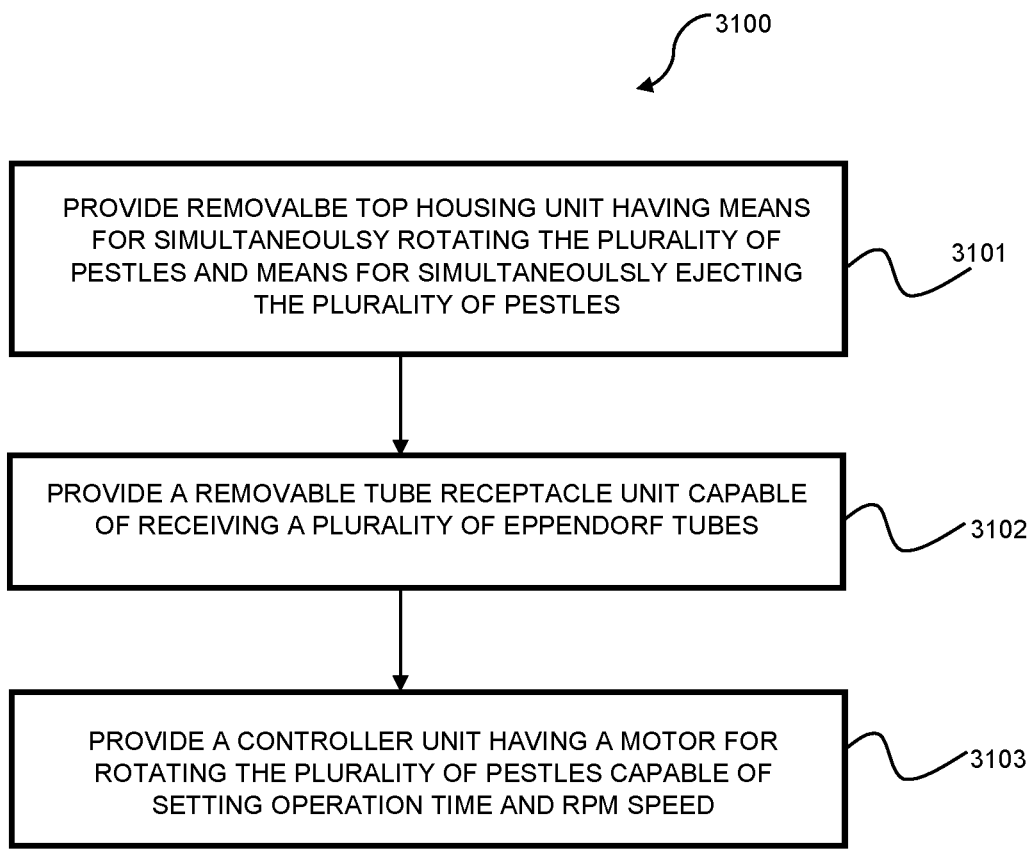
FIG. 31 illustrates a method for constructing a lab sample grinder apparatus configured to prevent cross-contamination, multiple grinding actions, and simple to use in accordance with an exemplary aspect of the present invention.

Now referring to FIG. 31, a method 3100 of constructing a lab sample grinder apparatus configured to prevent cross-contamination, multiple grinding actions, and simple to use in accordance with an exemplary aspect of the present invention is illustrated. Method 3100 is realized by lab sample grinder 1500 described above in FIG. 13-FIG. 30. In other aspects of the present invention, method 3100 is realized by lab sample grinder 100 disclosed in FIG. 1-FIG. 12.

At step 3101, a removable top housing unit having means for simultaneously rotating and means for ejecting a plurality of pestles is provided. Step 3101 is realized by top housing unit 1320 with interior components as described in FIG. 19.

At step 3102, a removable tube receptacle unit capable of receiving a plurality of Eppendorf tubes are provided. Step 3102 is realized by tube receptacle 1510 described above in FIG. 23. Tube receptacle unit 1510 has the shape of a half cut orange or a jewelry divider box. Each compartment 1516 contains an Eppendorf tube or the like.

At step 3103, a controller housing unit having a rotor and a controller circuit board is provided. The controller housing unit is coupled to rotate the plurality of pestles using the gear system. Step 3103 is realized by controller housing unit 1340 with control panel 1350 electrically coupled to controller circuit board 3000.

Figure 32:
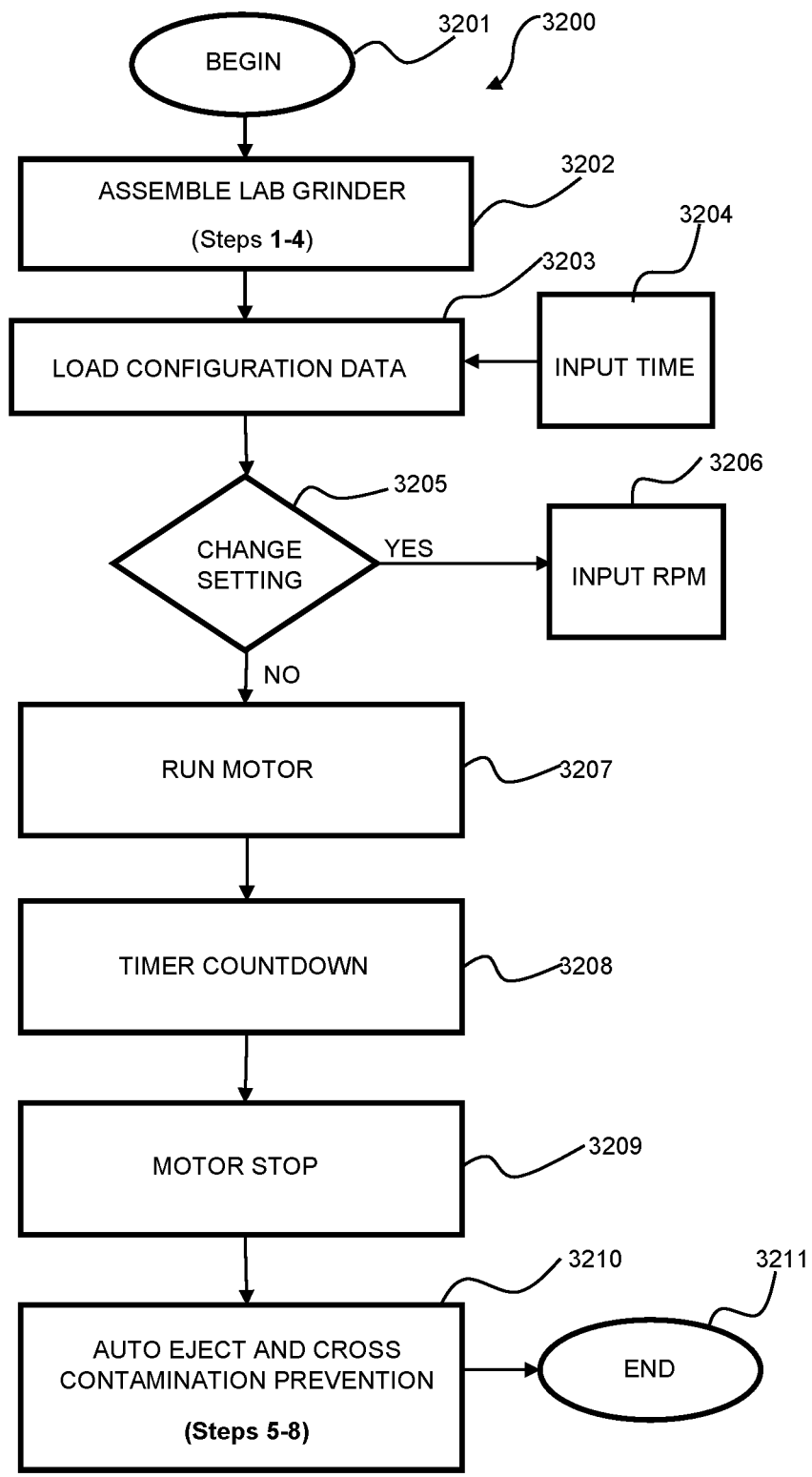
FIG. 32 illustrates a method 3200 of grinding a plurality of laboratory samples simultaneously without cross contamination in accordance with an exemplary aspect of the present invention.

Finally referring to FIG. 32, a method 3200 of grinding a plurality of laboratory samples simultaneously without cross contamination in accordance with an exemplary aspect of the present invention is illustrated. Method 3200 is realized by lab sample grinder 1500 disclosed above in addition to steps 1-8 in FIG. 28.

At step 3201, the lab sample grinding operation begins. Step 3201 is realized by obtaining lab sample grinder 1500 disclosed above. Top housing unit 1320, tube receptacle unit 1510, and controller housing unit 1340 are collected and prepared to assemble.

At step 3202, the lab sample grinder is assembled. Step 3202 is realized by steps 1-4 as described above in FIG. 29.

At step 3203, configuration data is loaded. In some aspects of the present invention, configuration data includes speed in rpm and operation time. In some other aspects of the present invention, configuration data is retrieved from a memory and automatically loaded to ARM MCU 2812.

At step 3204, the operation time is input. Step 3204 is realized by turning rotary knob 1351. Rotary knob 2851 is electrically coupled to ARM MCU 2812. Changing rotary knob 2851 registers operation time to ARM MCU 2812.

At step 3205, whether operation setting is changed. Step 3205 is realized by rotary knob 2851 and ARM MCU 2812.

At step 3206, the input speed (in rpm) is input. Step 3206 is realized by pressing in and turning rotary knob 2851.

At step 3207, the motor starts to run or the lab sampler grinder starts to operate. Sample inside Eppendorf tubes 2401 are ground or homogenized for a preset time and speed.

At step 3208, the operation time is counted down. Step 3208 is realized by ARM MCU 2812.

At step 3209, the motor is stopped when the time period is counted down. At this moment, the grinding is finished.

At step 3210, auto rejection and cross contamination prevention are automatically obtained when the lab sample grinder is complete. Step 3210 is realized by steps 5-8 disclosed in FIG. 29 above.

Finally, at step 3211, the grinding operation ends.

The foregoing description details certain embodiments of the invention. It will be appreciated by a person of ordinary skills in the art that connections between various components described herewith may be by any suitable means such as nails, screws, bolts, connectors, pins, staples, dowels and the like. It also will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

DESCRIPTION OF NUMERALS 100 laboratory sample grinding/milling/homogenizing device
200 main shaft
202 axle
204 squeeze disc lock
205 axle tip
206 motor connector
207 motor
300 first housing unit
301 top side of first housing unit
302 thru hole
303 lateral side of first housing unit
304 first foot base
305 first bottom interior segment
306e first interior collar
307 first top interior segment
311 array of pestle ejecting pins
313-314 first pair of position locking screws
323-324 second pair of position locking screws
400 second housing unit
401 second top segment
401e second top rim
402 second base segment
403 alignment lock key
404 second interior segment
404e interior edge
405 first array of mortar insertion holes
406 third shaft insertion hole
407 bottom divider
411 first array of pestle insertion holes
412 second shaft insertion hole
413-414 first pair of screw holes
421 second array of pestle insertion holes
422 third shaft insertion hole
423-424 second pair of screw holes
430 mounting sleeves
431 tubular body
432 flange
480 spacers
433-434 third pair of position locking screws
453-454 third pair of screw holes
500 third housing unit
501 alignment lock receiver
502 post-op unlock receiver
510 Third top segment
511 third top segment
511e third collar
512 third top surface
514 third foot base
521 second array of mortar insertion holes
522 fourth shaft insertion hole
710 array of tubes
711 mortars
712 hinged lid
713 seal cap
714 solvent
715 sample
810 array of pestles
801 pestle rod
802 header
900 controller unit
901 ON/OFF button
902 speed dial
903 electrical connector
904 display unit
905 operation time setting unit
906 digital running time display unit
907 warning LED
921 external devices
1000 planetary gear system
1001 driven gears
1002 bearings
1011 driving gear
1012 central bearing
1100 Electrical components of the lab sample grinder
1110 CPU
1120 display units & LED controllers
1130 power supplies and regulators
1140 ON/OFF control unit
1150 feedback systems and sensors
1160 speed varying motor
1180 memories
1190 I/O communication unit
1198 External communication channels
1199 Electrical conductors
1300 front side of lab grinder unit
1301 top side
1302 bottom side (rim)
1303 lateral side
1310 handle
1311 axle
1320 top housing unit
1330 base unit
1331 second alignment marker
1332 top rim border
1340 controller housing unit
1342 bottom rim border
1350 control panel
1351 rotary knob
1352 display panel
1400 back side of lab grinder unit
1411 power jack
1412 power ON/OFF switch
1500 fully assembled lab grinder unit
1511 receptacle alignment marker
1512 receptacle central opening
1513 central receptacle rim
1514 top tube insertion holes
1515 dividing wall
1516 compartment
1520 tube insertion unit 1521 tube alignment marker
1522 tube central opening
1524 lower tube insertion holes
1600A exterior of top housing unit
1601 axle through hole
1602 venting holes
1600B interior of top housing unit
1611 first edge level
1612 second edge level
1613 third edge level.
1700 interior components inside top housing unit
1720 first board
1721 tube insertion holes
1722 shaft hole
1731 gear container holes
7132 spacers
1735 end bearing holes
1738 idler gear container hole
1739 driver gear container hole
1730 second board
1732 spacers
1735 ejection pins
1740 third board
1741 bottom pestle ejection holes
1742 spacer holes
1743 bearing holes
1745 ejection pins
1750 fourth board
1751 top pestle ejection holes
1752 ramp connector holes
1753 bearing holes
1755 bearing poles
1800 components inside top housing unit
1801 bearing pole springs
1811 rotor coupler
1812 coupler shaft
1821 gears
1822 gear containers
2000 ramp pressing connector
2001 legs
2002 holes
2011 housing
2012 curved ramp
2013 curved ramp
2100 roller connector
2101 cylindrical body
2102 idler gear
2103 ball lock or pin lock
2111 first wheel housing unit
2112 first wheel
2124 second wheel housing unit
2122 second wheel
2200 planar view of gear system
2201 driver gear
2202 idler gear
2211 gear teeth
2301 shaft adaptor sleeve
2302 protective ring
2401 Eppendorf tubes
2402 Eppendorf tube cap
2501 bottom side of controller housing unit
2502 slit entrance
2503 hollow space
2511 first edge level
2512 second edge level
2524 bottom tube insertion holes
2601 rotor 2602 drive shaft
2603 rotor connector
2611 support board
2621 spring board
2622 spring slots
2623 rotor opening
2632 tube containers
2701 base cover lid
2800 controller circuit
2801 DC decoder motor
2811 power supply
2812 ARM MCU
2813 H-bridge
2851 rotary knob
2852 display unit

What is claimed is:

1. A device, comprising:
a controller unit having a motor and a controller circuit;
a tube receptacle unit, removably laid on top of said controller unit, comprising a plurality of compartments and a plurality of laboratory tubes;
a top housing unit, removably laid on top of said tube receptacle unit, comprising an array of pestles coupled to a gear system; wherein said array of pestles is configured to grind said laboratory samples in said plurality of laboratory tubes when said gear system is rotated by said motor; wherein said top housing unit comprises a handle coupled to a roller connector having a pair of wheels and a ramp pressing connector; wherein when said handle is rotated in a first direction causing said pair of wheels to roll down on said ramp pressing connector and to eject said array of pestles into said plurality of laboratory tubes.

2. The device of claim 1, wherein when said handle is rotated in a second direction in opposite to said first direction said handle causes said roller connector to roll up on said ramp pressing connector so that said array of pestles is coupled to said gear system.

3. The device of claim 2, wherein said top housing unit further comprises a first alignment marker designed to cause said array of laboratory tubes to line up with said plurality of pestles.

4. The device of claim 3, wherein said ramp press connector further comprises a body containing a pair of ramps; wherein said ramp connector further comprises a first ramp and a second ramp; wherein said first ramp is for said roller connector to roll downward and wherein said second ramp is for said roller connector to roll upward when said handle is rotated in said first direction and in said second direction respectively.

5. The device of claim 4, wherein said top housing unit further comprises a plurality of ejection pins arranged to line up contacting each of said array of pestles when said first alignment marker on said top housing unit is lined up with a second alignment marker on said tube receptacle unit and a third alignment marker on said controller unit.

6. The device of claim 5, wherein said gear system further comprises a driver gear located at the center, an idler gear, and a plurality of driven gears in gear communication with said driver gear and said idler gear.

7. The device of claim 6, wherein said gear system further comprises a plurality of gear containers operable to contain and protect said gear system.

8. The device of claim 7, wherein said controller unit further comprises a rotary knob and a display unit.

9. The device of claim 8, wherein said controller unit is operable to change a first mode and a second mode.

10. The device of claim 9, wherein said first mode comprises an angular velocity in rpm and said second mode comprises an operation duration.

11. The device of claim 10, wherein said controller unit further comprises:
- a power supply unit;
- a H-bridge circuit;
- a microcontroller; and
- a DC encoder circuit.

12. The device of claim 11, wherein said controller unit further comprises a plurality of spring devices; and a plurality of tube containers mounted on top of said plurality of spring devices.

13. The device of claim 12, wherein said controller unit operable to control said motor to rotate said gear system in said first direction and in said second direction, wherein said first direction is clockwise and said second direction is counterclockwise.

14. A method of grinding laboratory samples without cross-contamination using a device comprising a controller unit; a tube receptacle unit having a plurality of compartments and a plurality of laboratory tubes; a top housing unit having an array of pestles coupled to a gear system; said top housing unit equipped with a handle coupled to a roller connector having a pair of wheels and a ramp pressing connector; said top housing unit is removably laid on top of said tube receptacle unit which, in turn, laid on top of said controller unit so that when said handle is rotated in a first direction causing said pair of wheels to roll down on said ramp pressing connector and to eject said array of pestles into said plurality of laboratory tubes, comprising:
- (a) aligning said plurality of pestles, said plurality of laboratory tubes, and an array of pestle ejecting pins using at least two alignment markers;
- (b) grinding said laboratory tubes using said gear system driven by a motor; and
- (c) using said handle to press down said array of pestle ejecting pins which in turn causes said plurality of pestles to fall inside said plurality of laboratory tubes.

15. The method of claim 14 further comprising:
- (d) setting angular velocity and operation duration for said step of grinding using said controller unit.

16. The method of claim 15 further comprising:
- (e) separating said plurality of laboratory tubes by said compartments having compartment walls designed to separate each of said plurality of laboratory tubes.

17. The method of claim 16 further comprising:
- (f) rotating said handle in a second direction which causes said roller connector to roll up along said ramp pressing connector.

18. A method of manufacturing a cross-contamination free laboratory sample grinding device, comprising:
- (a) providing a controller unit having a motor and a controller circuit;
- (b) providing a tube receptacle unit, removably laid on top of said controller unit, comprising a plurality of compartments designed to contain a plurality of laboratory tubes;
- (c) providing a top housing unit, removably laid on top of said tube receptacle unit, comprising a plurality of pestles coupled to a gear system which is operated by said motor to grind laboratory samples, wherein said plurality of pestles is configured to grind laboratory samples contained in said plurality of laboratory tubes; and
- (d) providing a handle having a roller connector and a ramp connector, wherein said handle when rotated in a first direction causes a plurality of pestle ejecting pins to press down on said plurality of pestles so that said plurality of pestles fall down into said plurality of laboratory tubes.

19. The method of claim 18 further comprising:
- (e) providing alignment markers on said controller unit, said tube receptacle unit, and said top housing unit.

20. The method of claim 19 further comprising setting a grinding duration and speed for said motor using said controller circuit.

\* \* \* \* \*